US012573150B2

(12) United States Patent
Hu

(10) Patent No.: US 12,573,150 B2
(45) Date of Patent: Mar. 10, 2026

(54) POLYGON CORRECTION METHOD AND APPARATUS, POLYGON GENERATION METHOD AND APPARATUS, ELECTRONIC DEVICE, AND COMPUTER-READABLE STORAGE MEDIUM

(71) Applicant: Tencent Technology (Shenzhen) Company Limited, Shenzhen (CN)

(72) Inventor: Kaimo Hu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 178 days.

(21) Appl. No.: 18/609,168

(22) Filed: Mar. 19, 2024

(65) Prior Publication Data

US 2024/0257464 A1 Aug. 1, 2024

Related U.S. Application Data

(63) Continuation of application No. PCT/CN2023/114720, filed on Aug. 24, 2023.

(30) Foreign Application Priority Data

Sep. 7, 2022 (CN) ......................... 202211088700.0

(51) Int. Cl.
*G06T 17/20* (2006.01)

(52) U.S. Cl.
CPC .................................... *G06T 17/20* (2013.01)

(58) Field of Classification Search
None
See application file for complete search history.

(56) References Cited

U.S. PATENT DOCUMENTS 6,285,375 B1 * 9/2001 John, Jr. ................. G06T 17/20 345/441
6,816,170 B1 11/2004 Udeshi
(Continued)

FOREIGN PATENT DOCUMENTS

CN 103337084 A 10/2013
CN 113920184 A 1/2022
(Continued)

OTHER PUBLICATIONS

Nov. 16, 2023—(WO) Search Report—App PCT/CN2023/114720.

*Primary Examiner* — Sultana M Zalalee
(74) *Attorney, Agent, or Firm* — Banner & Witcoff, Ltd.

(57) ABSTRACT

This application provides a polygon correction method and apparatus, a polygon generation method and apparatus, a device, and a computer-readable storage medium. The polygon correction method includes: obtaining a to-be-corrected polygon, and generating at least two simple polygons based on an original outer boundary of the to-be-corrected polygon; determining an inclusion relationship between the at least two simple polygons; determining at least one first simple polygon as a new outer boundary of the corrected polygon from the at least two simple polygons based on the inclusion relationship between the at least two simple polygons; determining an internal hole corresponding to each first simple polygon based on at least one of an original hole of the to-be-corrected polygon and a second simple polygon; and generating each corrected polygon based on each first simple polygon and the internal hole respectively corresponding to each first simple polygon.

20 Claims, 8 Drawing Sheets

(56) References Cited

U.S. PATENT DOCUMENTS

| | | | | |
|---|---|---|---|---|
| 8,797,325 | B2 * | 8/2014 | Keall | G06T 11/203 345/442 |
| 2013/0321414 | A1 * | 12/2013 | Algreatly | G06T 17/30 345/420 |
| 2015/0032487 | A1 | 1/2015 | Shoen et al. | |
| 2018/0025541 | A1 | 1/2018 | Xie et al. | |
| 2019/0018907 | A1 * | 1/2019 | He | G06T 17/20 |

FOREIGN PATENT DOCUMENTS

| | | | |
|---|---|---|---|
| CN | 115187589 | A | 10/2022 |
| KR | 20160073147 | A | 6/2016 |

* cited by examiner

100 ⟍

2. Determine visible areas of a three-dimensional model at different view angles, merge the visible areas, perform polygon correction on a union of the visible areas the model, and generate a processed three-dimensional model based on a corrected simple polygon Server 400

1. Three-dimensional model

3. Processed three-dimensional model

4. Perform two-dimensional rendering by using the processed three-dimensional model First terminal 200

Second terminal 300

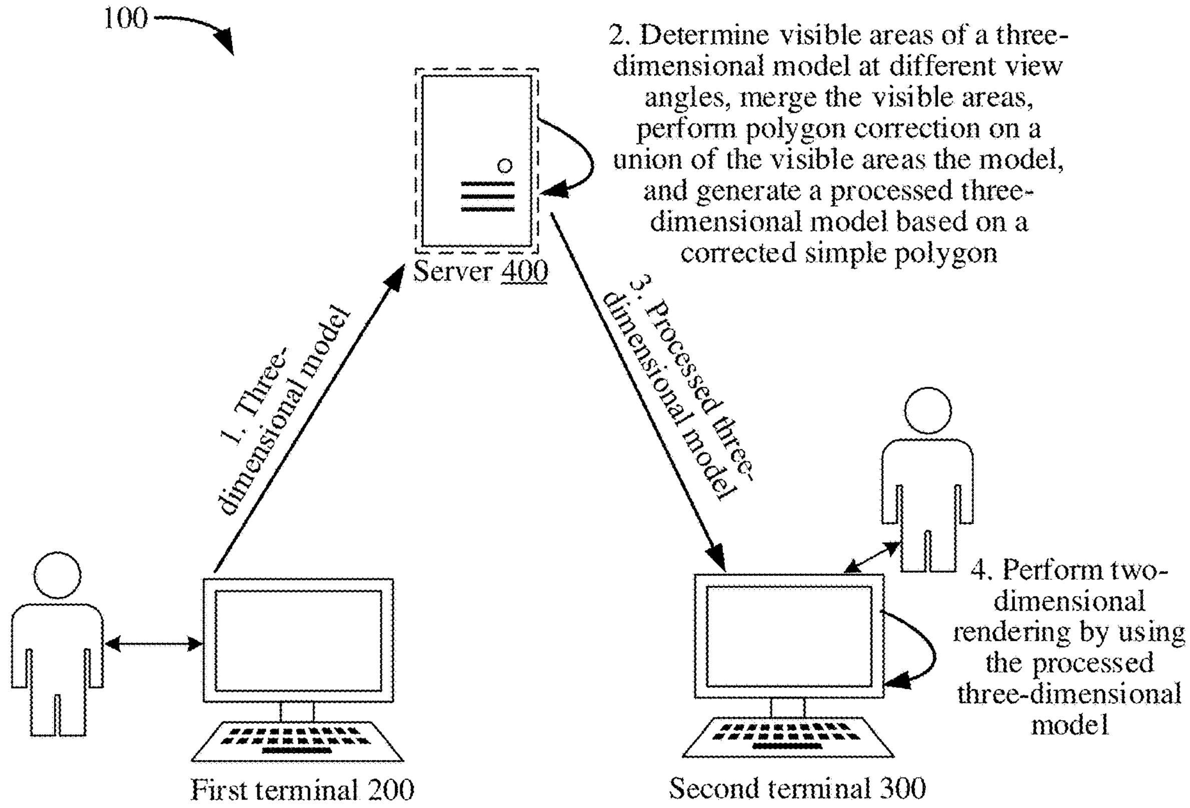

FIG. 2

Server 400

Memory 440

Operating system 441

Network communication module 442

Polygon correction apparatus 443

First generating module 4431

First determining module 4432

Second determining module 4433

Third determining module 4434

Second generating module 4435

Network interface 420

Processor 410

430

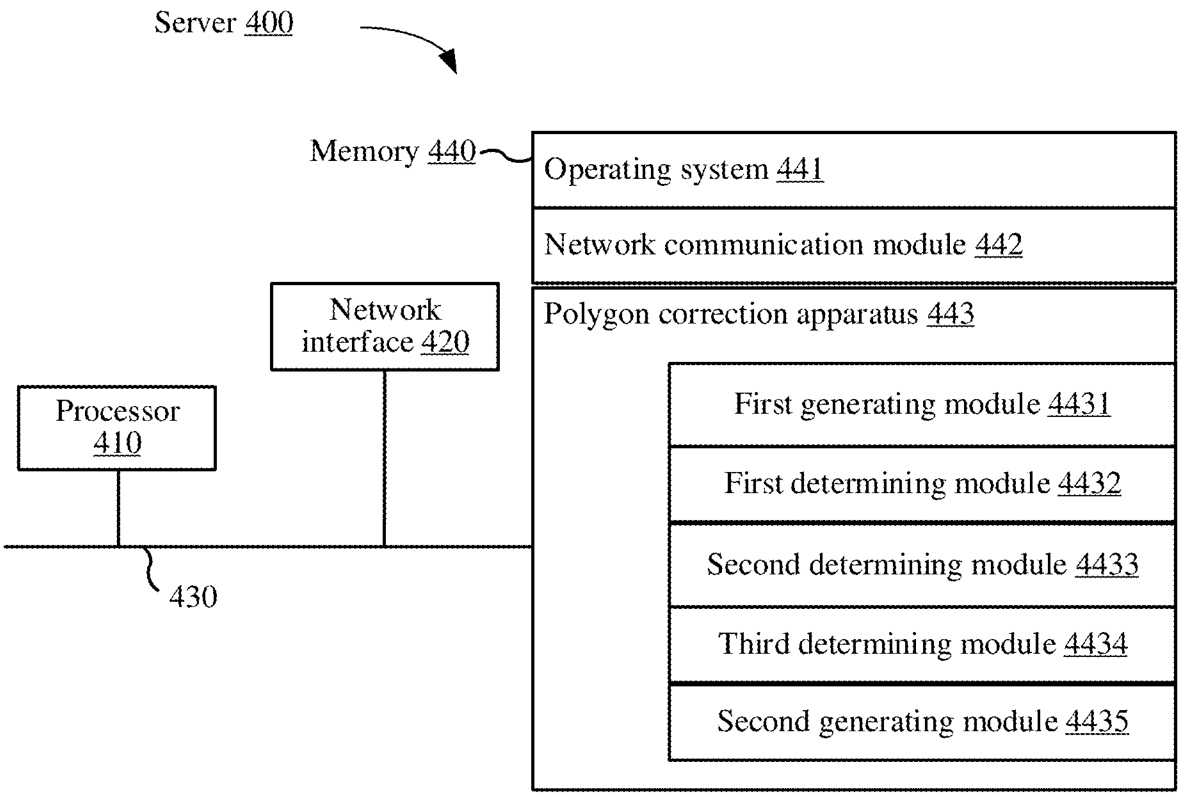

FIG. 3

Obtain a to-be-corrected polygon, and generate at least two simple polygons based on the to-be-corrected polygon          S101

Determine an inclusion relationship between the at least two simple polygons          S102

Determine at least one first simple polygon from the at least two simple polygons based on the inclusion relationship between the at least two simple polygons          S103

Determine an internal hole corresponding to each first simple polygon based on at least one of an original hole of the to-be-corrected polygon and a second simple polygon          S104

Generate each corrected polygon based on each first simple polygon and the internal hole respectively corresponding to each first simple polygon          S105

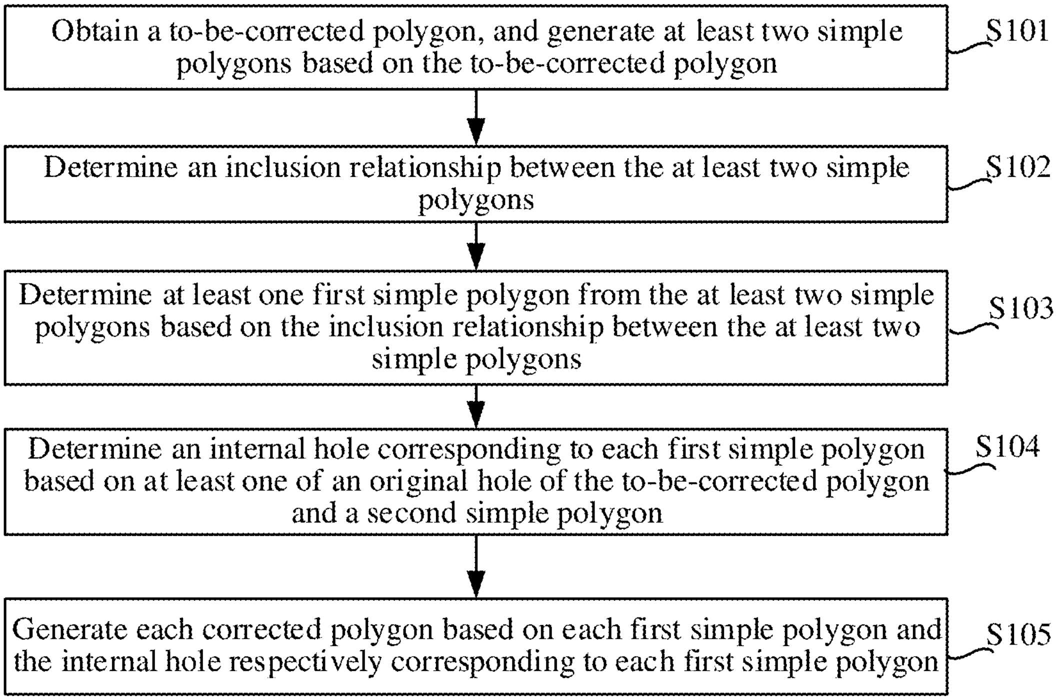

FIG. 4

| | |
|---|---|
| Obtain a plurality of line segments to be processed, and divide the plurality of line segments to obtain a plurality of target line segments | S301 |
| Establish a mapping set between endpoints of the target line segments and the target line segments based on the plurality of target line segments | S302 |
| Determine target endpoints being capable of constituting a ring based on the mapping set, and generate a simple polygon based on the target endpoints being capable of constituting a ring | S303 |
| Determine an inclusion relationship between at least two simple polygons in a case that a quantity of the generated simple polygons is at least two | S304 |
| Determine at least one third simple polygon from the at least two simple polygons based on the inclusion relationship between the at least two simple polygons | S305 |
| Determine an internal hole corresponding to each third simple polygon based on a fourth simple polygon | S306 |
| Generate each polygon with holes based on each third simple polygon and the internal hole respectively corresponding to each third simple polygon | S307 |

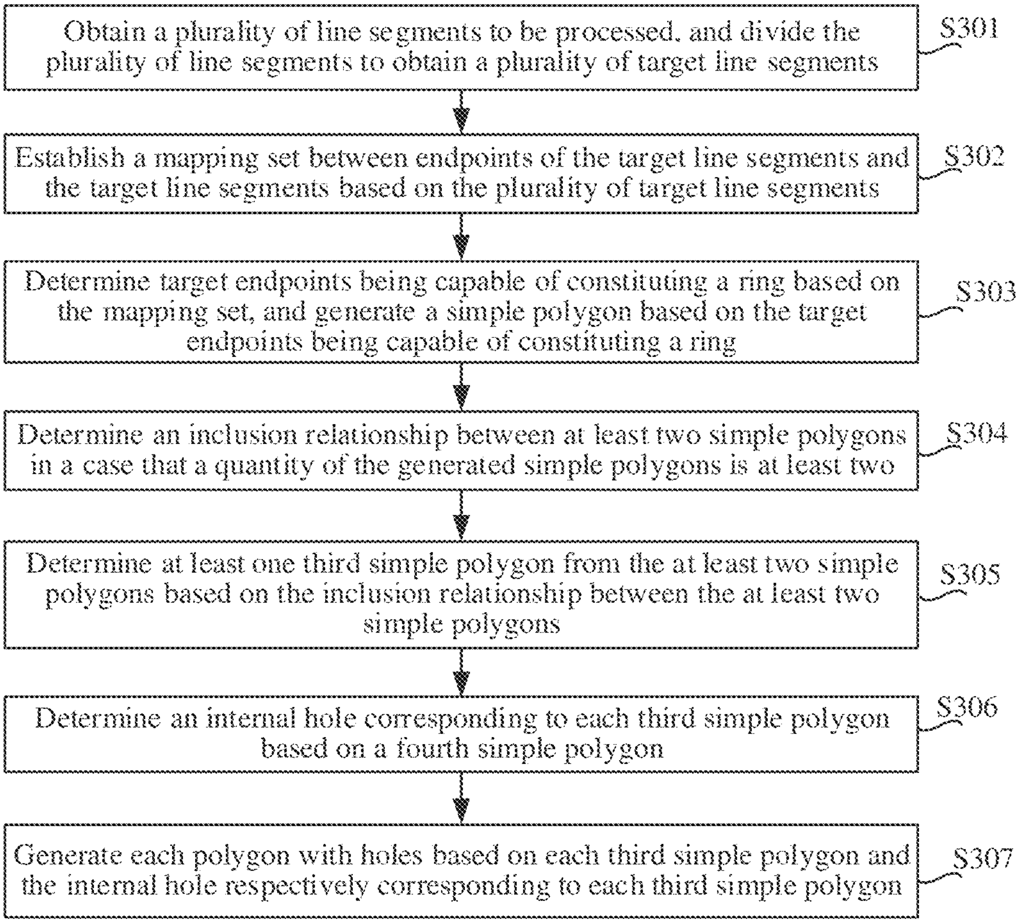

FIG. 6

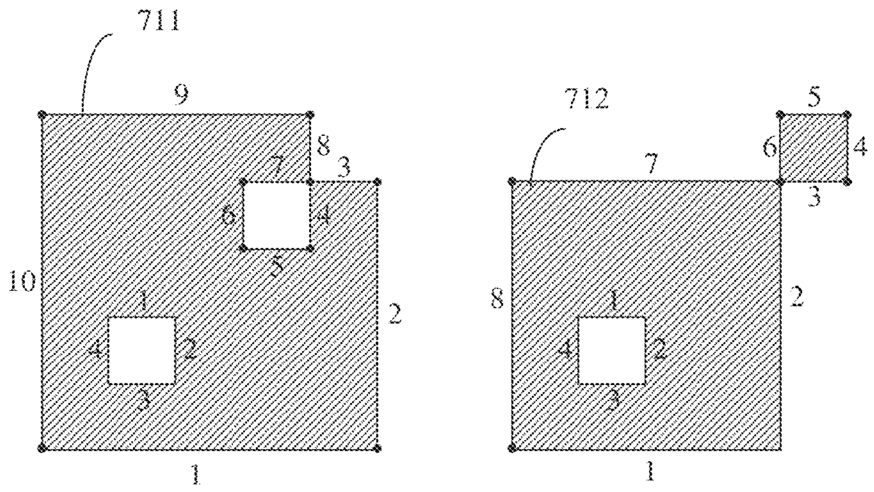

FIG. 7

POLYGON CORRECTION METHOD AND APPARATUS, POLYGON GENERATION METHOD AND APPARATUS, ELECTRONIC DEVICE, AND COMPUTER-READABLE STORAGE MEDIUM

RELATED APPLICATIONS

This application claims priority to Chinese Patent Application No. 202211088780.0, filed on Sep. 7, 2022, and is a continuation of PCT/CN2023/114720, filed on Aug. 24, 2023, both of which are incorporated herein by reference in its entirety.

TECHNICAL FIELD

This application relates to the field of data processing technologies, and in particular, to a polygon correction method and apparatus, a polygon generation method and apparatus, an electronic device, and a computer-readable storage medium.

BACKGROUND

Representing an effective area on a two-dimensional plane by using a polygon with holes is an input or output representation of many important geometric algorithms. In the related art, there are generally two types of implementations for generating the polygon with holes: (1) The polygon with holes is generated by using a preset geometric algorithm; and/or (2) An arrangement is constructed first by base primitives, and the polygon with holes is generated in the arrangement. In practice, it is found that using the preset geometric algorithm cannot ensure that an outer boundary of the polygon with holes is a simple polygon. Similarly, the arrangement constructed by the base primitive also cannot ensure that the outer boundary of the polygon with holes is a simple polygon. Although both implementations can represent the effective area in two-dimensional space, the outer boundary of the area is not a simple polygon, but a relative simple polygon. Although these types of polygons with holes can represent an effective area in two-dimensional space, correct execution of certain algorithms cannot be ensured which may cause significant challenges to the robustness of a computational geometry program and increases the debugging burden of a developer.

SUMMARY

Aspects described herein provide a polygon correction method and apparatus, a polygon generation method and apparatus, an electronic device, and a computer-readable storage medium, so that a generated non-simple polygon can be corrected to obtain a simple polygon, and robustness of a computational geometry program is improved.

According to one or more aspects, a polygon correction method may be performed by an electronic device and include:

- obtaining a to-be-corrected polygon, and generating at least two simple polygons based on the to-be-corrected polygon;
- determining an inclusion relationship between the at least two simple polygons;
- determining at least one first simple polygon from the at least two simple polygons based on the inclusion relationship between the at least two simple polygons, and using the first simple polygon as a new outer boundary of a corrected polygon;
- determining an internal hole corresponding to each first simple polygon based on at least one of an original hole of the to-be-corrected polygon and a second simple polygon, the second simple polygon being a polygon other than the first simple polygon among the at least two simple polygons; and
- generating each corrected polygon based on each first simple polygon and the internal hole respectively corresponding to each first simple polygon.

According to one or more further aspects, a polygon generation method may be performed by an electronic device and include:

- obtaining a plurality of line segments to be processed, and dividing the plurality of line segments to obtain a plurality of target line segments, different target line segments intersecting at an endpoint at most;
- establishing a mapping set between endpoints of the target line segments and the target line segments based on the plurality of target line segments;
- determining target endpoints being capable of constituting a ring based on the mapping set, and generating a simple polygon based on the target endpoints being capable of constituting a ring;
- determining an inclusion relationship between at least two simple polygons in a case that a quantity of the generated simple polygons is at least two;
- determining at least one third simple polygon from the at least two simple polygons based on the inclusion relationship between the at least two simple polygons, and using the third simple polygon as an outer boundary of a polygon with holes;
- determining an internal hole corresponding to each third simple polygon based on a fourth simple polygon, the fourth simple polygon being a polygon other than the third simple polygon among the at least two simple polygons; and
- generating each polygon with holes based on each third simple polygon and the internal hole respectively corresponding to each third simple polygon.

According to one or more aspects, a polygon generation apparatus may include:

- a first generating module, configured to obtain a to-be-corrected polygon, and generate at least two simple polygons based on the to-be-corrected polygon;
- a first determining module, configured to determine an inclusion relationship between the at least two simple polygons;
- a second determining module, configured to determine at least one first simple polygon from the at least two simple polygons based on the inclusion relationship between the at least two simple polygons, and use the first simple polygon as a new outer boundary of a corrected polygon;
- a third determining module, configured to determine an internal hole corresponding to each first simple polygon based on at least one of an original hole of the to-be-corrected polygon and a second simple polygon, the second simple polygon being a polygon other than the first simple polygon among the at least two simple polygons; and
- a second generating module, configured to generate each corrected polygon based on each first simple polygon and the internal hole respectively corresponding to each first simple polygon.

According to one or more further aspects, a polygon generation apparatus may include:

a line segment division module, configured to obtain a plurality of line segments to be processed, and divide the plurality of line segments to obtain a plurality of target line segments, different target line segments intersecting at an endpoint at most;

a mapping establishment module, configured to establish a mapping set between endpoints of the target line segments and the target line segments based on the plurality of target line segments;

a third generating module, configured to determine target endpoints being capable of constituting a ring based on the mapping set, and generate a simple polygon based on the target endpoints being capable of constituting a ring;

a fourth determining module, configured to determine an inclusion relationship between at least two simple polygons in a case that a quantity of the generated simple polygons is at least two;

a fifth determining module, configured to determine at least one third simple polygon from the at least two simple polygons based on the inclusion relationship between the at least two simple polygons;

a sixth determining module, configured to determine an internal hole corresponding to each third simple polygon based on a fourth simple polygon, the fourth simple polygon being a polygon other than the third simple polygon among the at least two simple polygons; and a fourth generating module, configured to generate each polygon with holes based on each third simple polygon and the internal hole respectively corresponding to each third simple polygon.

According to one or more further aspects, a computer device may include:

a memory, configured to store executable instructions; and a processor, configured to execute the executable instructions stored in the memory to implement the polygon correction method according to the embodiment of this application or the polygon generation method according to the embodiment of this application.

An embodiment of this application provides a computer-readable storage medium having executable instructions stored thereon, when executed by a processor, implementing the polygon correction method according to the embodiment of this application or the polygon generation method according to the embodiment of this application.

According to one or more further aspects, aa computer program product is provided, including a computer program or instructions that, when executed by a processor, cause a polygon correction method to be implemented.

Aspects described herein may have the following beneficial effects:

After a to-be-corrected polygon is obtained, at least two simple polygons are first generated based on an original outer boundary of the to-be-corrected polygon. Then, an inclusion relationship between the at least two simple polygons is determined. At least one first simple polygon is determined from the at least two simple polygons based on the inclusion relationship between the at least two simple polygons, and the first simple polygon is used as a new outer boundary of a corrected polygon. Next, an internal hole truly corresponding to each first simple polygon is determined based on an original hole of the to-be-corrected polygon and a second simple polygon. Finally, each corrected polygon is generated based on each first simple polygon and the internal hole respectively corresponding to each first simple polygon. Because the at least two simple polygons are generated based on the original outer boundary of the to-be-corrected polygon, the first simple polygon is used as the new outer boundary of the corrected polygon, and at least one of the second simple polygon and the original hole of the to-be-corrected polygon is determined as an internal hole of the first simple polygon. In other words, just changing a topology structure on the original outer boundary, such as changing a connection sequence and a connection relationship of vertexes, can ensure that corrected polygons are all simple polygons by correcting the original outer boundary, the internal hole, and the inclusion relationship between the original outer boundary and the internal hole without changing a geometric shape. In this way, robustness in subsequent geometry procedures may be improved by using the corrected polygons.

BRIEF DESCRIPTION OF THE DRAWINGS

FIG. 2 is a schematic diagram of an example network architecture of a polygon correction system according to one or more aspects described herein.

FIG. 3 is a schematic diagram of an example structure of a server according to one or more aspects described herein.

FIG. 4 is a schematic flowchart of an example polygon correction method according to one or more aspects described herein.

FIG. 6 is a schematic flowchart of an example polygon generation method according to one or more aspects described herein.

FIG. 7 is a schematic diagram of example polygons with holes of which outer boundaries do not satisfy a simple polygon condition according to one or more aspects described herein.

DETAILED DESCRIPTION

The following describes aspects of the disclosure in further detail with reference to the accompanying drawings. The aspects described herein are not limiting. Other aspects obtainable by a person of ordinary skill in the art without creative efforts shall fall within the scope of this disclosure.

In the following description, the term "some aspects" describes subsets of all possible aspects, but it may be understood that "some aspects" may be the same subset or different subsets of all possible aspects, and can be combined with each other without conflict.

In the following description, the term "first/second/third" is only used for distinguishing similar objects and does not represent a specific order of objects. It may be understood that "first/second/third" may be interchanged with a specific order or priority if permitted, so that aspects described here may be implemented in an order other than that illustrated or described.

Unless otherwise defined, meanings of all technical and scientific terms used herein may refer to the same meanings as those understood by a person skilled in the art. Terms used herein are merely intended to describe aspects of the disclosure, but are not intended to be limiting.

Before various aspects are further described in detail, certain terms are explained below.

(1) Simple polygon: A polygon is a closed shape constituted by three or more line segments connected end to end on a two-dimensional plane. A polygon that satisfies the following conditions is considered a simple polygon.

Closed: A starting point of a first line segment and an endpoint of a last line segment are the same vertex.

Simple: "Simple" means that no line segments on a polygon intersect each other internally, and all vertexes have degrees of two. Such a polygon has a well-defined interior and exterior and is topologically homeomorphic to a disk. A polygon that satisfies the "simple" condition is also referred to as a Jordan polygon.

Orientation: Vertexes on a polygon are arranged in a counterclockwise direction, so that a left side of each line segment represents an interior area of the polygon and a right side represents an exterior area.

Figure 1A:
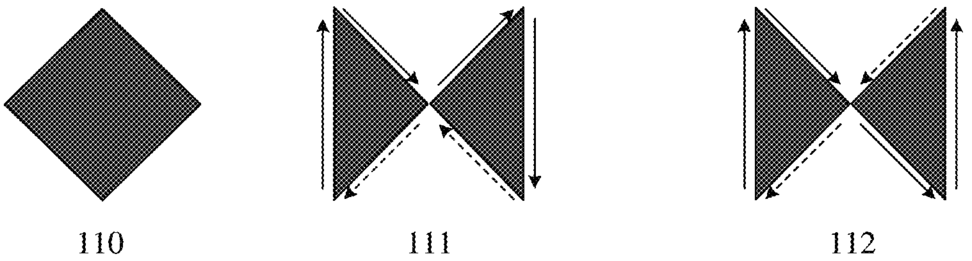
FIG. 1A is a schematic diagram of an example simple polygon, relative simple polygon, and non-relative simple polygon.

(2) Relative simple polygon: Compared with the three conditions that a simple polygon needs to satisfy, a relative simple polygon has less constraint conditions on "simple". For example, in a relative simple polygon, a vertex with a degree greater than two is allowed to exist, but the vertex needs to be orientable. In the example of FIG. 1A, 110 is a simple polygon (and a relative simple polygon); 111 is not a simple polygon, but a relative simple polygon; and 113 is neither a simple polygon nor a relative simple polygon.

(3) Polygon with holes: A polygon with holes is formed by an outer boundary and a plurality of holes included inside the outer boundary. To ensure correct execution of many geometric algorithms (such as Boolean operation, skeleton extraction, and triangulation) that use the polygon with holes as input, in the following description, it is assumed that a polygon with holes needs to satisfy the following conditions before being considered valid.

Closed: The outer boundary and all internal holes of the polygon with holes are closed.

Simple: The outer boundary and all internal holes of the polygon with holes are simple.

Orientation: Vertexes on the outer boundary need to be arranged in a counterclockwise direction, and vertexes on each internal hole are arranged in a clockwise direction.

Hole relationship: The following two conditions need to be satisfied: (1) All internal holes are included inside the outer boundary and do not intersect with the outer boundary, unless an intersection point is a vertex on the outer boundary and the internal hole; and (2) The internal holes do not intersect with each other, unless an intersection point is a vertex on two holes.

(4) Polygon set: A set including a series of polygons with holes and simple polygons on a plane is referred to as a polygon set. The polygon set may represent a plurality of effective areas on the plane.

Figure 1B:
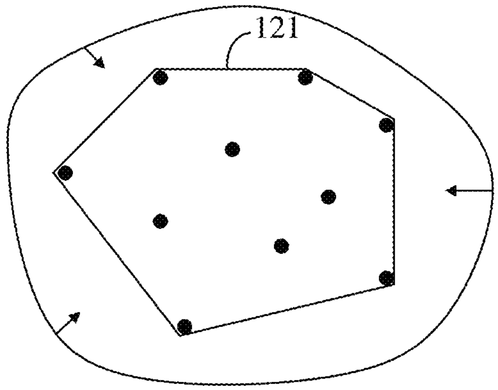
FIG. 1B is a schematic diagram of an example convex hull of a point set.

(5) Convex hull: In real number vector space, for a given set X, an intersection S of all convex sets including X may be referred to as a convex hull of X. In two-dimensional Euclidean space, the convex hull may be considered as a rubber band including all points. As shown in FIG. 1B, a polygon 121 represents a convex hull corresponding to a black point set.

Figure 1C:
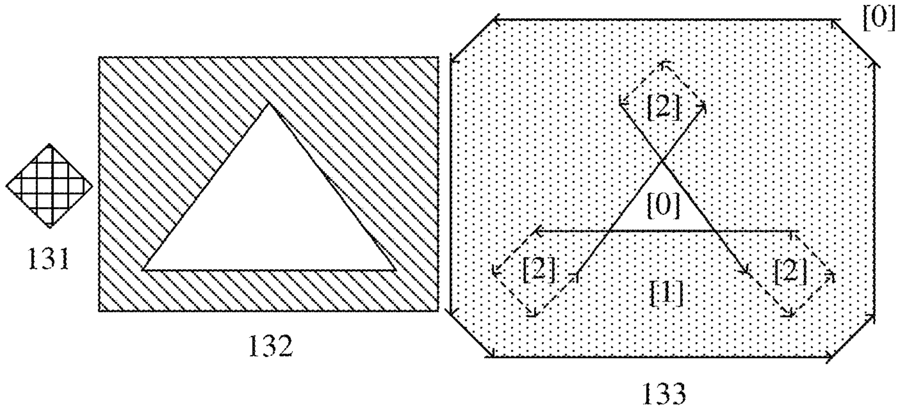
FIG. 1C is a schematic diagram of an example Minkowski sum of two vector sets.

(6) Minkowski sum: A Minkowski sum of given vector sets A and B is defined as $A+B=\{a+b|a\in A, b\in B\}$. For example, for areas 131 and 132 on the left section in FIG. 1C, a Minkowski sum of the areas is shown as 133 on the far right section, and the Minkowski sum may be represented by a polygon with holes.

(7) Arrangement: For a group of primitives (including a line segment, a vertex, and the like) on a plane, geometric shapes and topological connections of the primitives may form a division of the plane. These divisions may form geometric elements such as faces, edges, rings, and isolated points on the plane. For example, for FIG. 1D, the group of primitives may form faces such as $f_0$, $f_1$, $f_2$, $f_3$, and $f_4$, isolated points such as $u_1$ and $u_2$, and corresponding edges such as e, $e_{prev}$, and $e_{next}$.

(8) Boolean operation: The following five Boolean operations may be defined for given two-dimensional polygons P and Q.

Intersection: An intersection area of P and Q may be kept, and rest areas may be removed, which is formally represented as $R=P\cap Q$.

Union: P and Q may be merged into a new area, which may be represented as $R=P\cup Q$.

Difference: An intersecting part of P and Q may be removed from P, which may be represented as $R=P\backslash Q$.

Symmetric difference: P and Q may be merged into a new area, and an intersecting part of P and Q may be removed, which may be represented as $R=P\oplus Q=(P\backslash)\cup(Q\backslash P)$.

Complement: For a universal set S to which P belongs is given, a complement of P may be a part of S that does not belong to P, which may be represented as $R=\overline{P}=S\backslash P$.

Figure 1D:
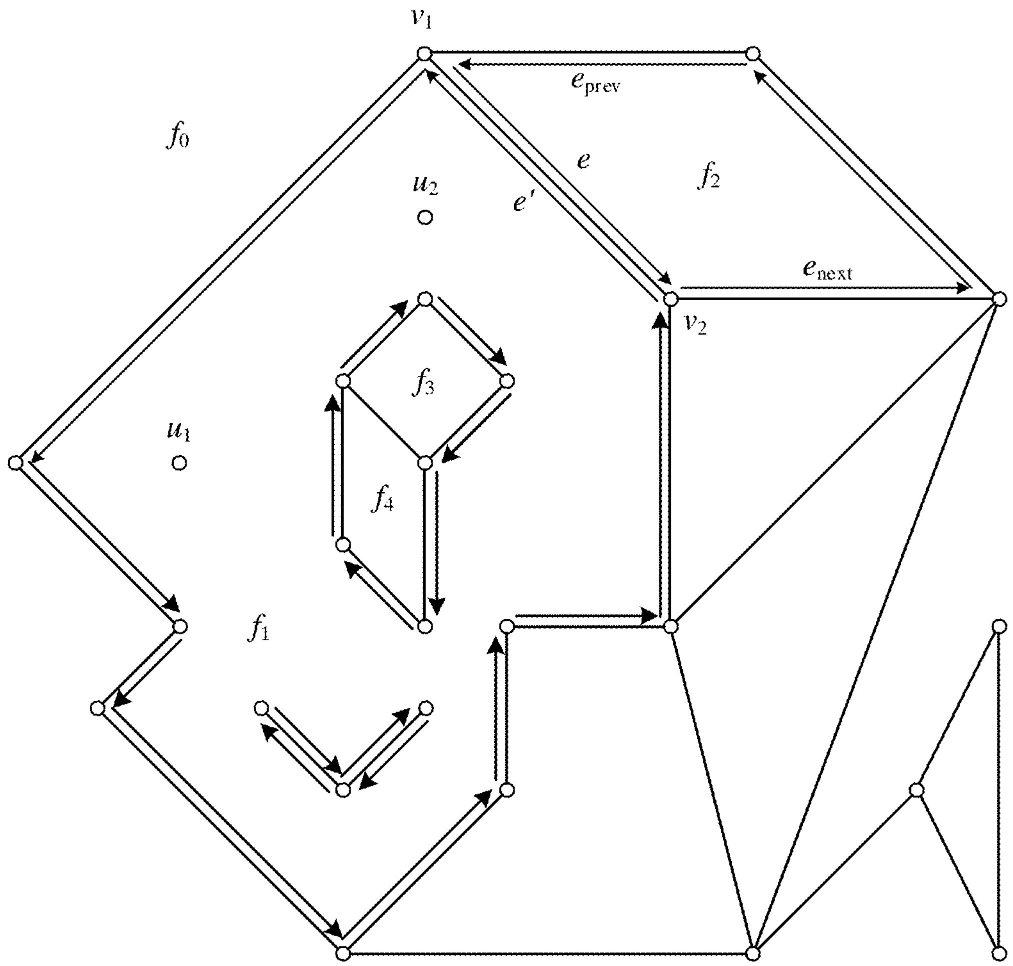
FIG. 1D is an example schematic diagram of using primitives on a plane to generate faces, edges, rings, and isolated points.

(9) 2D straight skeleton: 2D straight skeleton may be a division of an interior of a polygon with holes, and may be formed by internal intersection of angle bisectors of adjacent edges in an interior area of the polygon with holes. The 2D straight line skeleton may be used for easily generating inward and outward offset results of the polygon with holes, as shown in FIG. 1D.

(10) Voronoi diagram: A Voronoi diagram may also be referred to as a Thiessen polygon, and may include a group of continuous polygons formed by vertical bisectors connecting adjacent sites.

Figure 1E:
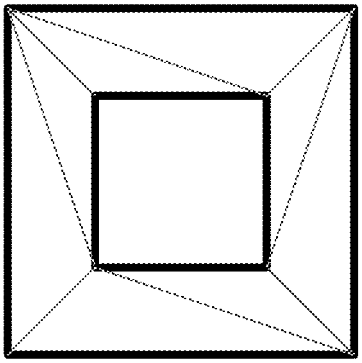
FIG. 1E is an example schematic diagram of constrained Delaunay triangulation.

(11) Constrained Delaunay triangulation: Delaunay triangulation of a point set P on a plane may be a triangulation DT(P), such that no point in P is strictly in an interior of a circumcircle of any triangle in DT(P). Constrained Delaunay triangulation may refer to Delaunay triangulation given some constrained edges. For example, for a "hollow square" shape shown in FIG. 1E, if an outer boundary and edges of internal holes of the shape are all used as constrained edges (as shown by black bold line segments), a Delaunay triangulation result of the shape may be triangles constituted by black bold line segments and gray line segments.

For processes in which a preset geometric algorithm is used and an arrangement is constructed based on base primitives, or a polygon with holes is generated in an arrangement, although the generated polygon with holes may be effective, it is not ensured that the generated polygon with holes is a simple polygon, resulting in incorrect execution of some algorithms. Aspects described herein provide polygon correction and generation algorithms, which can make a polygon with holes satisfy a simple polygon condition by (e.g., only) correcting a topological connection between an outer boundary and internal holes while maintaining an effective area of the polygon. By using the polygon correction methods described herein, there is no need to modify an existing polygon with holes generation algorithm. Instead, correction might only require use of a result generated based on the polygon generation algorithm as input o. The algorithm may then generate a simple polygon with holes that may be used as input to a series of the following geometric algorithms.

Aspects describe herein provide a polygon correction method and apparatus, a polygon generation method and apparatus, a device, and a computer-readable storage medium. A generated non-simple polygon can be corrected to obtain a simple polygon, thereby improving robustness of a computational geometry program. The following describes exemplary applications of a computer device provided in embodiments of this application. The computer device provided in the embodiments of this application may be implemented as various types of user terminals, such as a notebook computer, a tablet computer, a desktop computer, a set-top box, and a mobile device (for example, a mobile phone, a portable music player, a personal digital assistant, a dedicated messaging device, and a portable game device), or may alternatively be implemented as a server. An example application where the device is implemented as a server is described below.

The polygon correction methods and the polygon generation methods provided herein may be applied to a plurality of scenarios, such as an encasement scenario, a Voronoi diagram determining scenario, or an extraction scenario of visible areas of a three-dimensional model at multi-view angle. An example in which a polygon correction method is applied to an extraction scenario of visible areas of a three-dimensional model at multiple view angles is described. FIG. 2 is a schematic diagram of an example network architecture of a polygon correction system 100. The network architecture may include a first terminal 200, a second terminal 300, and a server 400. Communication connections may be established between the first terminal 200 and the server 400 and between the second terminal 300 and the server 400 by using a network (not shown in FIG. 2). The network may be a wide area network, a local area network, or a combination of the wide area network and the local area network.

The first terminal 200 may be a model design terminal. A model designer may use the first terminal 200 to design a three-dimensional model of a virtual object, and may design the three-dimensional model at different view angles. Then, the first terminal 200 may send the model at different view angles to the server 400. The server 400 may obtain model information at the different view angles, determine a visible area of the model corresponding to each view angle based on the model information at each view angle, and then merge visible areas of the model corresponding to each view angle to obtain a model visible area corresponding to the three-dimensional model. The model visible area corresponding to the three-dimensional model may be understood as a polygon set. The polygon set may include a plurality of polygons with holes, and then a constrained Delaunay triangulation method may be used for triangulating the plurality of polygons with holes. Because the merging of visible areas of the model corresponding to each view angle is determined by using Boolean operation in the Computational Geometry Algorithms Library (CGAL), the polygons with holes obtained at this time might not all be simple polygons, resulting in a situation where the constrained Delaunay triangulation method might not be able to be performed correctly. Therefore, after obtaining the model visible area corresponding to the three-dimensional model, the polygons with holes in the model visible area corresponding to the three-dimensional model that are not simple polygons may be corrected by using a polygon correction method described herein, and then corrected polygons may be used as input to the constrained Delaunay triangulation method. In this way, correct execution of the constrained Delaunay triangulation method can be ensured, and a processed three-dimensional model may be obtained. The server 400 may then send the processed three-dimensional model to the second terminal 300. The second terminal 300 may be a rendering terminal. The second terminal 300 may perform multi-view angle two-dimensional rendering by using the processed three-dimensional model. Because the processed three-dimensional model might only include a visible area of the model, an amount of model data may be reduced compared with an original three-dimensional model. Therefore, when two-dimensional rendering is performed, only the visible area might need to be rendered, so that resource overhead during two-dimensional rendering may be reduced and rendering efficiency improved.

According to some aspects, the server 400 may be an independent physical server, a server cluster or a distributed system including a plurality of physical servers, or a cloud server that provides basic cloud computing services such as a cloud service, a cloud database, cloud computing, a cloud function, cloud storage, a network service, cloud communication, a middleware service, a domain name service, a security service, content delivery network (CDN), big data, and an artificial intelligence platform. The first terminal 200 and the second terminal 300 may be smartphones, tablet computers, notebook computers, desktop computers, smart speakers, smartwatches, vehicle intelligent terminals, or the like, but are not limited thereto. The terminal and the server may be connected directly or indirectly in a wired or wireless communication manner, but is not limited to these examples.

FIG. 3 is a schematic diagram of an example structure of a server 400. The server 400 shown in FIG. 3 includes at least one processor 410, at least one network interface 420, a bus system 430, and a memory 440. Components in the server 400 may be coupled together through the bus system 430. It may be understood that, the bus system 430 may be configured to implement connection and communication between the components. In addition to a data bus, the bus system 430 may further include a power bus, a control bus, and a status signal bus. However, for ease of description, various buses are marked as the bus system 430 in FIG. 3.

The processor 410 may be an integrated circuit chip with a signal processing capability, such as a general-purpose processor, a digital signal processor (DSP), or another programmable logic device, discrete gate, transistor logic device, discrete hardware component, or the like. The general-purpose processor may be a microprocessor, any conventional processor, or the like.

The memory 440 may be removable, non-removable, or a combination thereof. For example, a hardware device includes a solid-state memory, a hard disk drive, an optical drive, and the like. The memory 440 optionally includes one or more storage devices physically away from the processor 410.

The memory 440 may include a volatile memory or a non-volatile memory, or may include both a volatile memory and a non-volatile memory. The non-volatile memory may be a read only memory (ROM), and the volatile memory may be a random access memory (RAM). The memory 440 described herein is intended to include any suitable type of memory.

In some arrangements, the memory 440 may be capable of storing data to support various operations. For example, the data may include a program, a module, a data structure, or a subset or superset thereof. Examples are described below.

An operating system 441, including a system program that is configured to process various basic system services and perform hardware-related tasks, such as a frame layer, a core library layer, and a drive layer, may be used for implementing various basic services and processing hardware-based tasks.

A network communication module 442 may be configured to reach another computing device via one or more (wired or wireless) network interfaces 420. For example, the network interface 420 may include Bluetooth, wireless compatibility certification (Wi-Fi), a universal serial bus (USB), and the like.

In some arrangements, the apparatus described in various examples herein may be implemented in a software manner. FIG. 3 shows a polygon correction apparatus 443 stored in the memory 440. The polygon correction apparatus may be software in the form of a program, plug-in, and the like, and may include the software modules such as a first generating module 4431, a first determining module 4432, a second determining module 4433, a third determining module 4434, and a second generating module 4435. These modules may be logical. Therefore, arbitrary combination or further splitting may be performed according to the implemented functions. The functions of the modules are described below.

In some other examples, apparatuses may be implemented in a hardware manner. As an example, an apparatus may be a processor in the form of a hardware decoding processor. The processor may be programmed to perform polygon correction methods described herein. For example, the processor in the form of a hardware decoding processor may use one or more application-specific integrated circuits (ASICs), DSPs, programmable logic devices (PLDs), complex programmable logic devices (CPLDs), field-programmable gate arrays (FPGAs), or other electronic components.

The polygon correction methods and the polygon generation methods will be described below with reference to an example application and a server configuration.

Aspects described herein further relate to a polygon correction method, applied to a computer device. The computer device may be a terminal or a server. An example in which the computer device is a server is used in the following description. FIG. 4 is a schematic flowchart of an example polygon correction method. Each step of this example polygon correction method is described with reference to FIG. 4.

Step S101: Obtain a to-be-corrected polygon, and generate at least two simple polygons based on the to-be-corrected polygon.

According to one or more aspects, the to-be-corrected polygon may be a polygon that does not satisfy a simple polygon condition. For example, the to-be-corrected polygon may be a polygon with holes of which an original outer boundary does not satisfy the simple polygon condition but satisfies a relative simple polygon condition, and original holes satisfy the simple polygon condition. Alternatively, the to-be-corrected polygon may be a polygon of which an original outer boundary and an original hole both do not satisfy the simple polygon condition but satisfy a relative simple polygon condition.

The original outer boundary and the original hole of the to-be-corrected polygon may refer to an initial original outer boundary and an initial internal hole before the to-be-corrected polygon is corrected.

The simple polygon condition may include: A starting point of a first line segment of a polygon and an endpoint of a last line segment of the polygon is the same vertex, no line segments on the polygon intersect each other internally, all vertexes have degrees (a quantity of edges attached to the vertex) of two, and a vertex arrangement direction is counterclockwise. The relative simple polygon condition may include: A starting point of a first line segment of a polygon and an endpoint of a last line segment of the polygon is the same vertex, no line segments on the polygon intersect each other internally, and a vertex arrangement direction is counterclockwise.

After obtaining the to-be-corrected polygon, the original outer boundary and the original hole of the to-be-corrected polygon may be determined based on topological structure information of the to-be-corrected polygon. The topology structure information of the to-be-corrected polygon includes a vertex identifier of each vertex and a connection relationship between vertexes.

When step S101 is implemented, if the outer boundary of the to-be-corrected polygon is a relative simple polygon and the original hole is a simple polygon, a plurality of simple polygons may be generated based on the outer boundary of the to-be-corrected polygon, and the original hole might not need to be processed. If the original hole and the original outer boundary of the to-be-corrected polygon both do not satisfy the simple polygon condition, a plurality of simple polygons are generated based on the original outer boundary and the original hole of the to-be-corrected polygon.

When generating the at least two simple polygons based on the original outer boundary of the to-be-corrected polygon is implemented, a "last-in, first-out" starting point stack may be first defined, and vertexes in the to-be-corrected polygon are then pushed into the stack in sequence. Each time a vertex is pushed, it may be determined whether elements in a current starting point stack may constitute a ring. If the elements in the current starting point stack may constitute a ring, a part that already constitutes a ring may be removed from the stack in time and a simple polygon may be generated. If the elements in the current starting point stack cannot constitute a ring, a step of pushing vertexes into the stack may be continued in a loop, until all vertexes are removed from the stack and the stack is empty.

When generating the at least two simple polygons based on the original outer boundary and the original hole of the to-be-corrected polygon is implemented, a plurality of simple polygons may be generated respectively based on the original outer boundary and the original hole. An process of generating the at least two simple polygons based on the original hole is similar to that of generating the simple polygons based on the original outer boundary.

Step S102: Determine an inclusion relationship between the at least two simple polygons.

For example, an inclusion relationship between two simple polygons may be determined. Because the at least two simple polygons do not intersect each other, and may have a common vertex at most, step S102 may include first obtaining a simple polygon from the at least two simple polygons, then determining an inclusion relationship between the obtained simple polygon and another simple polygon in sequence, then selecting a simple polygon from a polygon other than the obtained simple polygon, and then determining an inclusion relationship between the selected simple polygon and a remaining simple polygon in sequence. By analogy, this process may be repeated until an inclusion relationship between any two simple polygons in the at least two simple polygons has been determined.

Determining an inclusion relationship between a $p^{th}$ simple polygon and a $q^{th}$ simple polygon is used herein as an example. In this example, a vertex of the $p^{th}$ simple polygon may be obtained, and whether the vertex is located inside or outside the $q^{th}$ simple polygon may be determined. If the vertex is located inside the $q^{th}$ simple polygon, it means that the $q^{th}$ simple polygon includes the $p^{th}$ simple polygon, and the determining may be ended. If the vertex is located outside the $q^{th}$ simple polygon, it means that the $q^{th}$ simple polygon does not include the $p^{th}$ simple polygon, and the determining may also be ended. If the vertex is neither inside nor outside the $q^{th}$ simple polygon, it means that the vertex is a common vertex of the $p^{th}$ simple polygon and the $q^{th}$ simple polygon, and a remaining vertex of the $p^{th}$ simple polygon needs to be obtained again and the determining continues until whether the $q^{th}$ simple polygon includes the $p^{th}$ simple polygon is determined.

Step S103: Determine at least one first simple polygon from the at least two simple polygons based on the inclusion relationship between the at least two simple polygons.

For example, if the original outer boundary of the to-be-corrected polygon satisfies a non-simple polygon condition and the original hole of the to-be-corrected polygon satisfies the simple polygon condition, a simple polygon that is not included in any one of other simple polygons than the simple polygon among the at least two simple polygons may be determined as a first simple polygon. The first simple polygon may be used as a new outer boundary of a corrected polygon. If neither the original outer boundary nor the internal hole of the to-be-corrected polygon satisfies the simple polygon condition, a quantity of times each simple polygon is included may be determined, and a simple polygon that is included for an even quantity of times may be determined as a first simple polygon. The first simple polygon is a new outer boundary of the corrected polygon.

Content of the simple polygon condition and non-simple polygon condition is shown in step S101. Details are not described herein again.

Step S104: Determine an internal hole corresponding to each first simple polygon based on at least one of an original hole of the to-be-corrected polygon and a second simple polygon.

The second simple polygon may be a polygon other than the first simple polygon among the at least two simple polygons. In other words, the second simple polygon may be a newly determined internal hole.

Corresponding to step S103, if the original outer boundary of the to-be-corrected polygon satisfies the relative simple polygon condition and the original hole of the to-be-corrected polygon satisfies the simple polygon condition, an inclusion relationship between two polygons may be determined based on step S103, which may be implemented in the following manner. An original hole and a second simple polygon included in each first simple polygon may be determined, so that the internal hole corresponding to each first simple polygon is determined. If neither the original outer boundary of the to-be-corrected polygon nor the original hole of the to-be-corrected polygon satisfies the simple polygon condition, the second simple polygon included in each first simple polygon may be first determined. The second simple polygon may be determined as a candidate hole, and then a particular candidate hole that is not included in a candidate hole other than the particular candidate hole may be determined as the internal hole corresponding to the first simple polygon.

Step S105: Generate each corrected polygon based on each first simple polygon and the internal hole respectively corresponding to each first simple polygon.

After the internal hole actually corresponding to each first simple polygon is determined, each corrected polygon may be determined based on each first simple polygon and the internal hole actually corresponding to each first simple polygon.

For example, each first simple polygon and the internal hole actually corresponding to each first simple polygon are combined to a corrected polygon. Each first simple polygon may be used as an outer boundary, and the internal hole corresponding to each first simple polygon may be placed on a corresponding first simple polygon.

Figure 8:
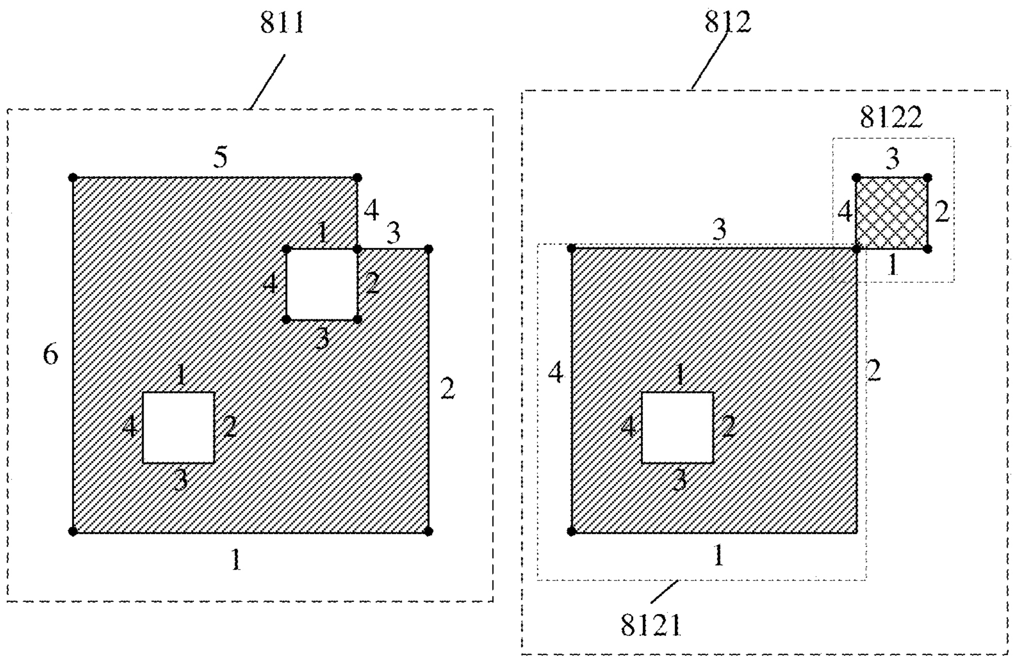
FIG. 8 is a schematic diagram of example polygons obtained by correcting the polygons with holes of which outer boundaries do not satisfy a simple polygon condition according to one or more aspects described herein.

FIG. 7 is a schematic diagram of example polygons with holes of which outer boundaries do not satisfy a simple polygon condition. FIG. 8 is a schematic diagram of example polygons obtained by correcting the polygons with holes of which outer boundaries do not satisfy a simple polygon condition. An outer boundary of area 711 in FIG. 7 may include edges 1 to 10, which does not satisfy a simple polygon condition. Area 811 in FIG. 8 is a corrected polygon of area 711 in FIG. 7. The corrected area 711 includes two square internal holes, and an outer boundary constituted by a first simple polygon, including edges 1 to 6.

In some examples, after each corrected polygon is generated, the corrected polygon may be used to perform subsequent geometric algorithms. For example, for a Nest tool in Automatic Lightmap UVs, after an external offset of a polygon is calculated, the polygon correction method may be used to correct the offset, and then a correction result may be used to calculate a Minkowski sum of remaining texture space, so that a success rate of calculating a Minkowski sum can be increased from 92% to 100%.

The Automatic Lightmap UVs is a procedural content generation (PCG) technology tool for a 3D modeling artist to make lightmap UVs faster.

According to one or more aspects of the polygon correction method, after a to-be-corrected polygon is obtained, at least two simple polygons may be first generated based on the to-be-corrected polygon. Then, an inclusion relationship between the at least two simple polygons may be determined. At least one first simple polygon as a new outer boundary may be determined from the at least two simple polygons based on the inclusion relationship between the at least two simple polygons. Next, an internal hole truly corresponding to each first simple polygon may be determined based on at least one of an original hole of the to-be-corrected polygon and a second simple polygon. Finally, each corrected polygon may be generated based on each first simple polygon and the internal hole respectively corresponding to each first simple polygon. Because the at least two simple polygons may be generated based on the to-be-corrected polygon, the process just changes a topology structure of the to-be-corrected polygon, such as changing a connection sequence and a connection relationship of vertexes, can ensure that corrected polygons are all simple polygons by correcting the original outer boundary, the internal hole, and the inclusion relationship between the original outer boundary and the internal hole without changing a geometric shape. In this way, robustness in subsequent geometry procedures may be improved by using the corrected polygons.

In some example, the "generating at least two simple polygons based on the to-be-corrected polygon" in step S101 may be implemented in different ways based on whether the original outer boundary of the to-be-corrected polygon and the original hole of the to-be-corrected polygon satisfy the simple polygon condition.

If the original outer boundary of the to-be-corrected polygon satisfies the relative simple polygon condition and the original hole of the to-be-corrected polygon satisfies the simple polygon condition, it means that the original hole itself may be a simple polygon and does not need to be processed, and that the process might only need to generate the at least two simple polygons based on only the original outer boundary of the to-be-corrected polygon.

If neither the original outer boundary of the to-be-corrected polygon nor the original hole of the to-be-corrected polygon satisfies the simple polygon condition, it means that both the original outer boundary and the original hole might need to be processed, and at this time, the at least two simple polygons may be generated based on the original outer boundary and the original hole.

Figure 5:
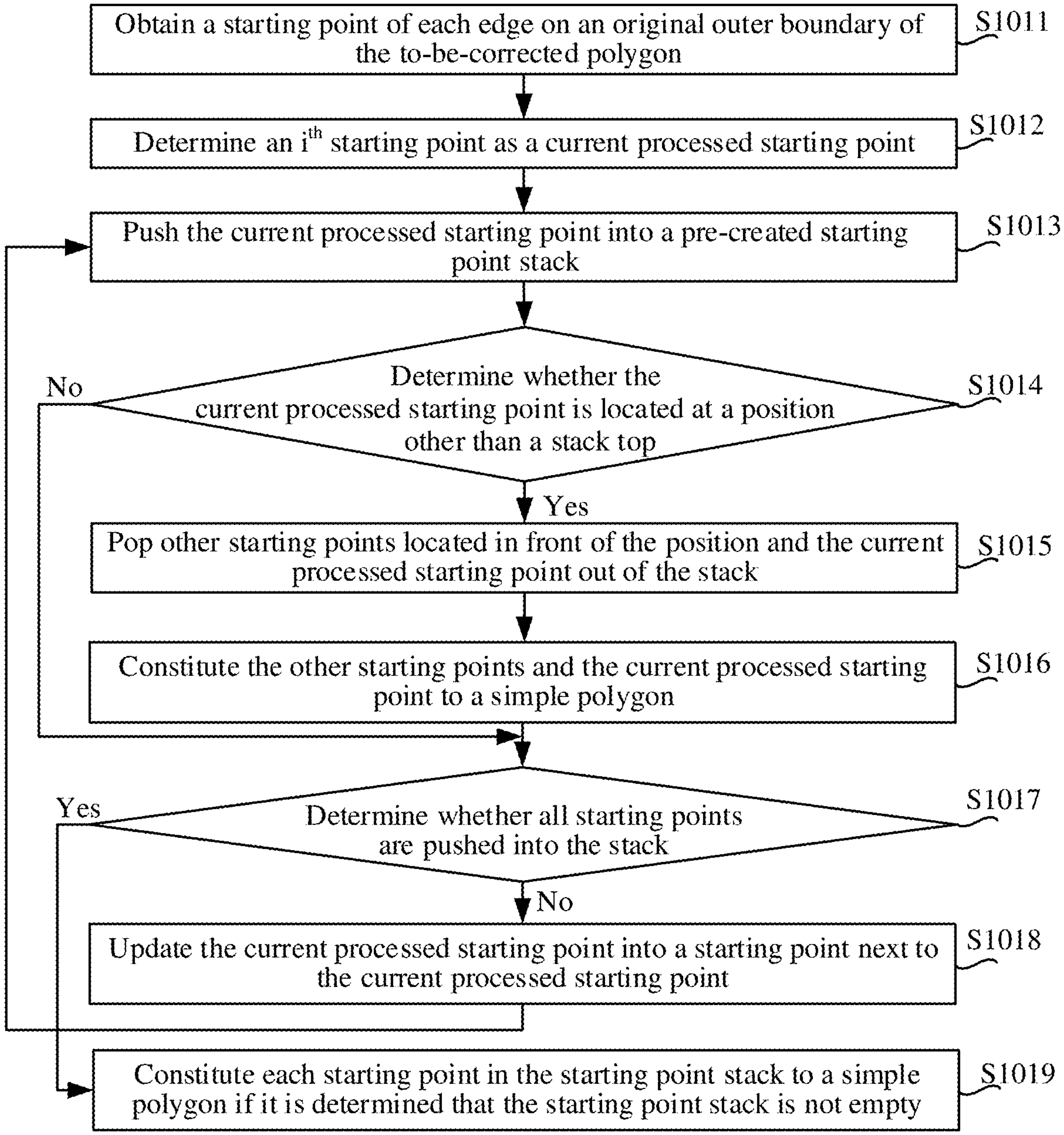
FIG. 5 is a schematic flowchart of an example process for generating a simple polygon based on an original outer boundary of a to-be-corrected polygon according to one or more aspects described herein.

The following describes an example process of generating the at least two simple polygons based on the original outer boundary of the to-be-corrected polygon. The process may be implemented by step S1011 to step S1019 shown in FIG. 5. Each step is described below with reference to FIG. 5.

Step S1011: Obtain a starting point of each edge on the original outer boundary of the to-be-corrected polygon.

In one or more arrangements, the starting point of each edge on the original outer boundary may be determined based on topological structure information of the to-be-corrected polygon. Because the topological structure information of the to-be-corrected polygon may include a vertex on the original outer boundary of the to-be-corrected polygon and a vertex index of each edge on the original outer boundary, the starting point of each edge on the original outer boundary may be determined based on the vertex index, and starting points of the edges on the original outer boundary obtained at this time may be arranged in sequence according to connection relationships of different edges.

Step S1012: Determine an $i^{th}$ starting point as a current processed starting point.

i=1, 2, . . . , N, N is a total quantity of starting points on the original outer boundary.

Step S1013: Push the current processed starting point into a pre-created starting point stack.

The starting point stack is a stack structure configured to store the starting point of each edge on the original outer boundary. A process of adding an element into the stack may be referred to as "pushing". A process of extracting a specified element from the stack may be referred to as "popping". The current processed starting point may be pushed into the starting point stack, and then the current processed starting point may be at a stack top of the starting point stack.

Step S1014: Determine whether the current processed starting point exists at a position other than the stack top.

If the current processed starting point is located at a position other than the stack top, it may mean that there is a starting point set in the stack being capable of constituting a ring, and at this time, step S1015 may be performed. If the current processed starting point does not exist at a position other than the stack top, it may mean that there is no starting point set in the stack being capable of constituting a ring, and at this time, step S1017 may be performed.

Step S1015: Pop other starting points located in front of a position other than the stack top and the current processed starting point out of the stack.

At this time, a current processed starting point that is not located at the stack top might not be popped out of the stack. In other words, after other starting points and the current processed starting point are popped out of the stack, an element at the stack top might still be a current processed starting point.

Step S1016: Constitute the other starting points and the current processed starting point to a simple polygon.

In step S1016, the current processed starting point and the other starting points may be connected in a sequence of popping out of the stack to constitute an initial polygon. If a vertex arrangement direction of the initial polygon is counterclockwise, it may mean that the initial polygon is a simple polygon. If a vertex arrangement direction of the initial polygon is clockwise, vertexes may be connected in a reverse direction, to obtain a simple polygon.

Step S1017: Determine whether all starting points are pushed into the stack.

If all starting points are not pushed into the stack, step S1018 may be performed. If all starting points are already pushed into the stack, step S1019 may be performed.

Step S1018: Update the current processed starting point into a starting point next to the current processed starting point.

At this time, step S1013 may be performed. In other words, the current processed starting point may be pushed into the starting point stack, and subsequent steps may be performed.

Step S1019: Constitute each starting point in the starting point stack to a simple polygon if it is determined that the starting point stack is not empty.

In step S1019, each starting point in the starting point stack may be first popped out of the stack in sequence, and the starting points may be connected in a sequence of popping out of the stack to constitute an initial polygon. It may also be necessary to determine a vertex arrangement direction of the initial polygon. If the vertex arrangement direction of the initial polygon is counterclockwise, the initial polygon may be determined as a simple polygon. If the vertex arrangement direction of the initial polygon is clockwise, vertexes of the initial polygon may be connected in a reverse direction, and a reversed polygon may be determined as a simple polygon.

In step S1011 to step S1019, each vertex being capable of constituting a ring may be determined by pushing each vertex on the original outer boundary of the to-be-corrected polygon into the stack, and each vertex being capable of constituting a ring may be popped out of the stack to generate a simple polygon. Then, the vertexes on the original outer boundary may be pushed into the stack continuously until all vertexes are determined. In this way, it can be ensured that all the polygons generated based on the original outer boundary are simple polygons, to provide a data basis for subsequent determining of an inclusion relationship of different simple polygons.

According to one or more aspects, each vertex being capable of constituting a ring may be determined one by one by pushing into the stack, ensuring that each vertex can be determined. In this way, accuracy of obtaining simple polygons and accuracy of determining an inclusion relationship of simple polygons in subsequent calculations may be improved, calculation efficiency of obtaining the simple polygons may be improved, and calculation resources may be reduced.

In some arrangements, the "constituting the other starting points and the current processed starting point to a simple polygon" in step S1016 may be implemented by the following step S161 to step S165. Each step is described below.

Step S161: Connect the current processed starting point and the other starting points in a sequence of popping out of the stack, to obtain an initial polygon.

Step S162: Determine a vertex arrangement direction of the initial polygon.

In step S1016, any two adjacent edges may be selected in the initial polygon, assuming that the two adjacent edges are a first connecting edge and a second connecting edge. The first connecting edge may correspond to a first vector, and the second connecting edge may correspond to a second vector. The first vector corresponding to the first connecting edge may be determined based on coordinates of two vertexes on the first connecting edge, and the second vector corresponding to the second connecting edge may be determined based on coordinates of two vertexes on the second connecting edge. Then, the first vector and the second vector may be turned into three-dimensional vectors respectively by adding 0 to a z-axis, and a cross product of a first three-dimensional vector and a second three-dimensional vector may be calculated. If a z-axis component of the cross product is greater than zero, it may be determined that a vertex arrangement sequence is counterclockwise. If a z-axis component of the cross product is less than zero, it may be determined that a vertex arrangement sequence is clockwise.

Step S163: Determine whether the vertex arrangement direction is clockwise.

If the vertex arrangement direction is clockwise, step S164 may be performed. If the vertex arrangement direction is counterclockwise, step S165 may be performed.

Step S164: Reverse the initial polygon to obtain a simple polygon.

Reversing the initial polygon may refer to an arrangement where a connection sequence of vertexes is reversed. A situation where the initial polygon has four vertexes, namely A, B, C, and D, and the connection sequence is A-B-C-D-A is an example of reversing the initial polygon. The initial polygon may be reversed, in other words, the connection sequence may be updated to A-D-C-B-A. At this time, a vertex arrangement direction of the obtained simple polygon may be counterclockwise.

Step S165: Determine the initial polygon as the simple polygon.

In step S161 to step S165, each vertex may be connected in the sequence of popping out of the stack, and then an initial polygon may be obtained. The initial polygon may be closed with vertexes having a degree of two. To make the initial polygon a simple polygon, it may be necessary to ensure that the vertexes of the initial polygon are arranged in a counterclockwise sequence. Therefore, if the vertexes of the initial polygon are arranged in a counterclockwise sequence, the initial polygon may be determined as the simple polygon. If the vertexes of the initial polygon are arranged in a clockwise sequence, the vertex arrangement direction of the initial polygon may be reversed, so that the polygon is in a counterclockwise direction and the simple polygon may be obtained.

In some examples, the simple polygon may be determined based on the vertex arrangement direction, so that accuracy of obtaining simple polygons and accuracy of determining an inclusion relationship of simple polygons in subsequent calculations may be improved, calculation efficiency of obtaining the simple polygons may be improved, and calculation resources may be reduced.

In some embodiments, the "determining an inclusion relationship between the at least two simple polygons" in step S102 may be implemented by the following steps.

Step S1021: Obtain a $p^{th}$ simple polygon and a $q^{th}$ simple polygon from the at least two simple polygons.

p=1, 2, . . . , M, q=1, 2, . . . , M, and p is not equal to q. This step may be to select any two simple polygons from the at least two simple polygons.

Step S1022: Obtain an $s^{th}$ vertex of the $p^{th}$ simple polygon.

s=1, 2, . . . , S, and S is a total quantity of vertexes of the $p^{th}$ simple polygon.

Step S1023: Determine whether the $s^{th}$ vertex is located inside the $q^{th}$ simple polygon.

When the determining whether the $s^{th}$ vertex is located inside the $q^{th}$ simple polygon is implemented, a maximum x-coordinate and a minimum x-coordinate as well as a maximum y-coordinate and a minimum y-coordinate may be determined based on a coordinate of each vertex in the $q^{th}$ simple polygon. Then, whether an x-coordinate of the $s^{th}$ vertex is greater than the minimum x-coordinate and less than the maximum x-coordinate, and whether a y-coordinate of the $s^{th}$ vertex is greater than the minimum y-coordinate and less than the maximum y-coordinate may be determined based on a coordinate of the $s^{th}$ vertex. If the x-coordinate of the $s^{th}$ vertex is greater than the minimum x-coordinate and less than the maximum x-coordinate, and the y-coordinate of the $s^{th}$ vertex is greater than the minimum y-coordinate and less than the maximum y-coordinate, it may be determined that the $s^{th}$ vertex is located inside the $q^{th}$ simple polygon, and step S1024 may be performed. If the x-coordinate of the $s^{th}$ vertex is less than the minimum x-coordinate or greater than the maximum x-coordinate, or the y-coordinate of the $s^{th}$ vertex is less than the minimum y-coordinate or greater than the maximum y-coordinate, it may be determined that the $s^{th}$ vertex is not located inside the $q^{th}$ simple polygon, and step S1025 may be performed.

Step S1024: Determine that the $q^{th}$ simple polygon includes the $p^{th}$ simple polygon.

Because the $p^{th}$ simple polygon and the $q^{th}$ simple polygon do not intersect, if there is a vertex in the $p^{th}$ simple polygon located inside the $q^{th}$ simple polygon, it may mean that other vertexes are also located inside the $q^{th}$ simple polygon, or the $p^{th}$ simple polygon shares vertexes with the $q^{th}$ simple polygon. At this time, it may be learned that the $q^{th}$ simple polygon includes the $p^{th}$ simple polygon.

Step S1025: Determine whether the $s^{th}$ vertex is located outside the $q^{th}$ simple polygon.

If the x-coordinate of the $s^{th}$ vertex is less than the minimum x-coordinate or greater than the maximum x-coordinate, and the y-coordinate of the $s^{th}$ vertex is less than the minimum y-coordinate or greater than the maximum y-coordinate, it may be determined that the $s^{th}$ vertex is located outside the $q^{th}$ simple polygon, and step S1026 is performed. If it is determined that the $s^{th}$ vertex is neither located outside the $q^{th}$ simple polygon nor inside the $q^{th}$ simple polygon, it may mean that the $s^{th}$ vertex is a common vertex of the $p^{th}$ simple polygon and the $q^{th}$ simple polygon, and step S1027 is performed.

Step S1026: Determine that the $q^{th}$ simple polygon does not include the $p^{th}$ simple polygon.

Step S1027: Obtain an $(s+1)^{h}$ vertex, and determine an inclusion relationship between the $p^{th}$ simple polygon and the $q^{th}$ simple polygon based on the $(s+1)^{th}$ vertex.

In step S1027, similar to step S1023 to step S1026, if the (s+1)th vertex is located inside the $q^{th}$ simple polygon, it may be determined that the $q^{th}$ simple polygon includes the $p^{th}$ simple polygon, and if the $(s+1)^{th}$ vertex is located outside the $q^{th}$ simple polygon, it may be determined that the $q^{th}$ simple polygon does not include the $p^{th}$ simple polygon.

In step S1021 to step S1026, an inclusion relationship between the $p^{th}$ simple polygon and the $q^{th}$ simple polygon can be determined based on whether one or more vertexes of the $p^{th}$ simple polygon are located inside the $q^{th}$ simple polygon. Because simple polygons do not intersect with each other, if a vertex of the $p^{th}$ simple polygon is located inside the $q^{th}$ simple polygon, it can be determined that the $p^{th}$ simple polygon is located inside the $q^{th}$ simple polygon, in other words, the $q^{th}$ simple polygon includes the $p^{th}$ simple polygon. If the $p^{th}$ simple polygon has a vertex located outside the $q^{th}$ simple polygon, it can be determined that the $p^{th}$ simple polygon is located outside the $q^{th}$ simple polygon, in other words, the $q^{th}$ simple polygon does not include the $p^{th}$ simple polygon. In this way, calculation efficiency of determining an inclusion relationship between two simple polygons can be improved.

According to one or more aspects, an inclusion relationship between simple polygons is determined by a relationship between vertexes. In this way, a calculation speed of obtaining the inclusion relationship may be improved, calculation resources may be reduced, and calculation efficiency of determining an inclusion relationship between two simple polygons can be improved.

In some arrangements, "determining at least one first simple polygon from the at least two simple polygons based on the inclusion relationship between the at least two simple polygons" in step S103 may be implemented in different ways based on whether the original outer boundary of the to-be-corrected polygon and the original hole of the to-be-corrected polygon satisfy the relative simple polygon condition, as described below.

If the original outer boundary of the to-be-corrected polygon satisfies the relative simple polygon condition and the original hole of the to-be-corrected polygon satisfies the simple polygon condition, because in step S101 only the topology structure of the original outer boundary might need to be changed to obtain the at least two simple polygons, the simple polygons may be outer boundaries if the simple polygons obtained at this time are not included in another simple polygon. At this time, step S103 may include the following.

A simple polygon that is not included in any one of simple polygons among the at least two simple polygons may be determined as the first simple polygon based on the inclusion relationship between the at least two simple polygons.

Correspondingly, if the original outer boundary of the to-be-corrected polygon satisfies the relative simple polygon condition and the original hole of the to-be-corrected polygon satisfies the simple polygon condition, the "determining an internal hole corresponding to each first simple polygon based on at least one of an original hole of the to-be-corrected polygon and a second simple polygon" in step S104 may include the following.

Step S1041A: Determine a second simple polygon included in the first simple polygon based on the inclusion relationship between the at least two simple polygons.

Because the inclusion relationship between two simple polygons in the at least two simple polygons may be determined in step S102, the second simple polygon included in the first simple polygon can also be determined based on the inclusion relationship.

Step S1042A: Determine an original hole existing at an internal vertex of the first simple polygon as an original hole included in the first simple polygon.

In some examples, if an original hole has a vertex inside the first simple polygon, it may mean that the original hole is located inside the first simple polygon, in other words, that the first simple polygon includes the original hole.

Step S1043A: Determine the second simple polygon included in the first simple polygon and the original hole included in the first simple polygon as internal holes corresponding to the first simple polygon.

In step S1041A to step S1043A, the internal hole included in the first simple polygon as the new outer boundary can be determined. Therefore, in subsequent steps, a polygon with holes may be generated based on the first simple polygon and the internal hole corresponding to the first simple polygon, and the polygon with holes may be a simple polygon. In this way, it can be ensured that subsequent geometric programs can be executed correctly, accuracy of obtaining a simple polygon and correcting a polygon can be improved, and robustness of a geometric program can also be improved.

If neither the original outer boundary of the to-be-corrected polygon nor the original hole of the to-be-corrected polygon satisfies the simple polygon condition, in step S101, a simple polygon may be generated based on the original outer boundary and the original hole. At this time, the "determining at least one first simple polygon from the at least two simple polygons based on the inclusion relationship between the at least two simple polygons" in step S103 may include the following.

Step S1031: Obtain a quantity of times each simple polygon is included based on the inclusion relationship between the at least two simple polygons.

The quantity of times each simple polygon is included may be 0, 1, 2, 3, and the like. If a quantity of times a simple polygon is included is 0, it may mean that the simple polygon is not included in any simple polygon.

Step S1032: Determine a simple polygon that is included for an even quantity of times as the first simple polygon.

If the quantity of times the simple polygon is included is an even number, it may mean that the simple polygon is not an internal hole, but another outer boundary included inside the polygon.

Correspondingly, if neither the original outer boundary of the to-be-corrected polygon nor the original hole of the to-be-corrected polygon satisfies the simple polygon condition, the "determining an internal hole corresponding to each first simple polygon based on at least one of an original hole of the to-be-corrected polygon and a second simple polygon" in step S104 may include the following.

Step S1041B: Determine a second simple polygon included in the first simple polygon based on the inclusion relationship between the at least two simple polygons.

of the principles of step S1041B may be the same as that of step S1041A. Accordingly, details of step S1041B are not described herein again.

Step S1042B: Determine the second simple polygon included in the first simple polygon as a candidate hole corresponding to the first simple polygon.

In the step, the second simple polygon (that is, the candidate hole) included in the first simple polygon may be determined, but the candidate hole might not be determined as a hole of the first simple polygon, because the candidate hole may be an outer boundary of a new polygon with holes.

Step S1043B: Determine a candidate hole that is not included in any one of other candidate holes than the candidate hole as an internal hole corresponding to the first simple polygon.

If a candidate hole is not included in any candidate holes other than the candidate hole, in other words, the candidate hole is only included in the first simple polygon, the candidate hole may truly be a hole of the first simple polygon. If a candidate hole is included in one or more other candidate holes, the candidate hole may be an outer boundary in a case that the candidate hole is included in only one of the other candidate holes. In a case that the candidate hole is included in two of the other candidate holes, the candidate hole may be truly a hole of the other candidate holes that directly include the candidate hole.

In step S1041B to step S1043B, for the original outer boundary of the to-be-corrected polygon that is not a relative simple polygon, when a real hole included in the new outer boundary is determined, the second simple polygon and the original hole included in the new outer boundary may be first determined as candidate holes. Then the inclusion relationship between candidate holes may be obtained, and a candidate hole that is not included in any one of other candidate holes than the candidate hole may be determined as an internal hole truly corresponding to the first simple polygon. In this way, a case in which another outer boundary is determined as an internal hole can be avoided to ensure correctness of a corrected polygon.

Another example application includes a polygon generation method applied to a scenario where a plurality of line segments are used to generate a simple polygon. FIG. 6 is a schematic flowchart of an example polygon generation method.

Step S301: Obtain a plurality of line segments to be processed, and divide the plurality of line segments to obtain a plurality of target line segments.

Different target line segments may intersect at an endpoint at most, in other words, two target line segments either intersect at an endpoint or do not intersect.

In step S301, the plurality of line segments may be intersected in pairs and the line segments may be divided from intersection points to obtain the plurality of target line segments that only intersect at endpoints. In some example, the plurality of target line segments may constitute a line segment array A.

Figure 10:
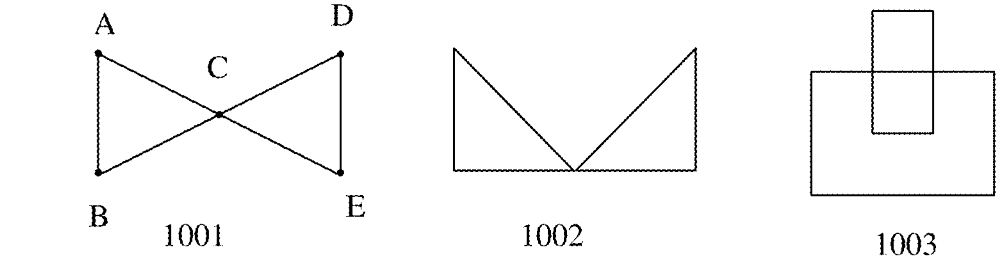
FIG. 10 is a schematic diagram of example polygons formed by disordered line segments according to one or more aspects described herein.

Polygon 1001 in FIG. 10 is used as an example for description. The plurality of line segments to be processed may include four line segments, namely AB, DE, AE, and BD. The line segments may be intersected in pairs, e.g., AB and BD are intersected at an intersection point B, and a condition of being intersected at an endpoint may be satisfied. Then, DE and AE are intersected at an intersection point E, and a condition of being intersected at an endpoint may also be satisfied. Next, AE and BD may be intersected at an intersection point C, and AE and BD may be divided from the point C to obtain line segments AC, CE, BC, and CD. Then, AB and DE may be intersected but there might not be any intersection point, so that processing might not be performed at this time. For polygon 1001 in FIG. 10, after step S301, there are four line segments, namely AB, DE, AE, and BD before division, and after division, AE among the four line segments is divided into AC and CE, BD among the four line segments is divided into BC and CD, and six line segments AB, DE, AC, CE, BC, and CD may be obtained.

Step S302: Establish a mapping set between endpoints of the target line segments and the target line segments based on the plurality of target line segments.

The mapping set may include a plurality of mapping relationships between the endpoints of target line segments and the target line segments. Polygon 1001 in FIG. 10 is further used as an example for description. Polygon 1001 includes five endpoints, namely A, B, C, D, and E. Correspondingly, there may be five mapping relationships: A→AC, AB, B→BC, AB, C→AC, BC, CE, CD, D→CD, DE, and E→DE, CE.

Step S303: Determine target endpoints being capable of constituting a ring based on the mapping set, and generate a simple polygon based on the target endpoints being capable of constituting a ring.

In step S302, a connection relationship between the line segments is established by using the mapping set, so that in this step, the endpoints being capable of constituting a ring can be determined based on the connection relationship. Then, the endpoints may be constituted in a simple polygon. Polyline segments not being capable of constituting a ring (corresponding to dangling edges in an arrangement) might not be useful for generating a simple polygon and may therefore be discarded.

Step S304: Determine an inclusion relationship between at least two simple polygons in a case that a quantity of the generated simple polygons is at least two.

For example, a principle of step 304 may be the same as that of step 102. For details of step 304, reference may be made to step 102. Accordingly, details of step 304 are not described herein again.

Step S305: Determine at least one third simple polygon from the at least two simple polygons based on the inclusion relationship between the at least two simple polygons.

In this example, the third simple polygon may be used as an outer boundary of a polygon with holes. A definition of the third simple polygon may be the same as the foregoing first simple polygon. For details of step 305, reference may be made to step 103, and thus, details are not described herein again.

Step S306: Determine an internal hole corresponding to each third simple polygon based on a fourth simple polygon.

The fourth simple polygon may be a polygon other than the third simple polygon among the at least two simple polygons. A definition of the fourth simple polygon may be the same as the foregoing second simple polygon. For details of step 306, reference may be made to step 104 and thus, details are not described herein again.

Step S307: Generate each polygon with holes based on each third simple polygon and the internal hole respectively corresponding to each third simple polygon.

Step S304 to step S307 are substantially similar to step S102 to step S105. Accordingly, details of step S304 to step S307 are not described herein. Reference may be made to the details of step S102 to step S105.

In the polygon generation method, when a plurality of unordered line segments are input, the plurality of line segments may be first divided to obtain a plurality of target line segments, a mapping set between endpoints of the target line segments and the target line segments may be established based on the plurality of target line segment, and a connection relationship between the line segments may be established by using the mapping set. Therefore, target endpoints being capable of constituting a ring can be determined based on the mapping set and a simple polygon may be generated based on the target endpoints being capable of constituting a ring. If a quantity of the generated simple polygons is at least two, it may be necessary to determine an inclusion relationship between the at least two simple polygons, and at least one third simple polygon used as a new outer boundary may be determined from the at least two simple polygons based on the inclusion relationship between the at least two simple polygons. Then, an internal hole truly corresponding to each third simple polygon may be determined based on a fourth simple polygon. Finally, each simple polygon may be generated based on each third simple polygon and the corresponding internal hole of each third simple polygon. In this way, a polygon formed by the unordered line segments can be generated to a simple polygon, thereby ensuring that a geometric algorithm can be executed correctly by using the simple polygon.

In some arrangements, the mapping set may include a plurality of mapping relationships between the endpoints and the target line segments. Correspondingly, the "determining target endpoints being capable of constituting a ring based on the mapping set" in step S303 may include the following.

Step S30301: Obtain a $j^{th}$ endpoint from the mapping set, and determine the $j^{th}$ endpoint as a current processed endpoint.

j=1, 2, . . . , J, and J is a total quantity of endpoints. Polygon 1001 in FIG. 10 is further used as an example. It is assumed that a first endpoint is A. At this time, A may be determined as the current processed endpoint.

Step S30302: Push the current processed endpoint into a pre-created endpoint stack.

Step S30303: Determine whether a target line segment corresponding to the current processed endpoint exists in the mapping set.

The mapping set is {A→AC, AB, B→BC, AB, C→AC, BC, CE, CD, D→CD, DE, E→DE, CE}. At this time, a target line segment corresponding to A may exist in the mapping set.

Step S30304: Determine whether only one target line segment corresponding to the current processed endpoint exists.

If only one target line segment corresponding to the current processed endpoint exists, step S30305 may be performed. If at least two target line segments corresponding to the current processed endpoint exist, step S30314 may be performed.

Following the foregoing example, because A corresponds to the target line segments AC and AB, in other words, the current processed endpoint corresponds to two target line segments, step S30314 may be performed.

Step S30305: Delete the target line segment from the mapping set, and push the other endpoint of the target line segment into the endpoint stack.

In this step, the target line segment may be deleted from the mapping set. If the target line segment corresponding to the endpoint exists in a plurality of mapping relationships, the target line segment may be deleted from the plurality of mapping relationships.

Step S30306: Determine whether an endpoint that is the same as a stack top endpoint exists in the endpoint stack.

In a case that the endpoint stack has the same endpoint as a stack top endpoint, it may mean that endpoints being capable of constituting a ring exist in the endpoint stack, and step S30307 may be performed. If a same endpoint as the stack top endpoint does not exist in the endpoint stack, it may mean that endpoints being capable of constituting a ring do not exist in the endpoint stack, and step S30308 is performed.

Step S30307: Pop each endpoint above the endpoint (i.e., the endpoint that is the same as the stack top endpoint) out of the stack, and determine each endpoint as a target endpoint being capable of constituting a ring.

Step S30308: Determine whether all endpoints in the mapping set are already pushed into the stack.

If it is determined that all endpoints in the mapping set are not pushed into the stack, step S30309 may be performed. If it is determined that all endpoints in the mapping set are already pushed into the stack, step S30310 may be performed.

Step S30309: Update the current processed endpoint into an endpoint next to the current processed endpoint, and perform step S30302.

Step S30310: Determine whether the endpoint stack is empty.

If the endpoint stack is empty, the process may end. If the endpoint stack is not empty, step S30311 may be performed.

Step S30311: Determine whether current endpoints in the endpoint stack can constitute a ring.

If the current endpoints in the endpoint stack can constitute a ring, step S30312 may be performed. If the current endpoints in the endpoint stack cannot constitute a ring, step S30313 may be performed.

Step S30312: Determine the current endpoints as the target endpoints.

Step S30313: Delete all current endpoints from the endpoint stack and end the process.

Step S30314: Back up a current mapping set and a current endpoint stack to obtain the backed-up mapping set and the backed-up endpoint stack.

Step S30315: Determine a to-be-deleted target line segment from the at least two target line segments corresponding to the current processed endpoint.

In this step, one of the at least two target line segments corresponding to the current processed endpoint may be randomly determined as the to-be-deleted target line segment. Following the foregoing example, a current processed endpoint A may correspond to target line segments AC and AB. At this time, AC may be selected as a to-be-deleted target line segment.

Step S30316: Determine the target endpoints being capable of constituting a ring based on the current mapping set and the to-be-deleted target line segment.

For this step, reference may be made to an implementation process from step S30305 to step S30313. First, AC may be deleted from the mapping set, and the mapping set is {A→AB, B→BC, AB, C→BC, CE, CD, D→CD, DE, E→DE, CE}. Then, C may be pushed into the stack, and the endpoint stack may include endpoint A and endpoint C. Since only endpoints A and C are in the endpoint stack, it may be determined that A and C cannot constitute a ring. And since the mapping set still includes additional endpoints, it is determined that not all of the endpoints in the mapping set have been pushed into the stack. Then, the next endpoint, that is, B, in the mapping set may be pushed into the stack. Because B corresponds to two target line segments, it may be assumed that AB is determined as the to-be-deleted target line segment, and at this time, the other endpoint A of AB may be pushed into the stack. Because endpoint A already exists in the endpoint stack, endpoints that already exist above endpoint A may be determined as target endpoints being capable of constituting a ring, in other words, endpoints A, B, and C may be target endpoints, and the target endpoints may be constituted to a simple polygon. At this time, only endpoint A might exist in the endpoint stack, and the mapping set may be {A→AB, B→BC, C→BC, CE, CD, D→CD, DE, E→DE, CE}. Then, D may be pushed into the stack. It is assumed that a to-be-deleted target line segment corresponding to endpoint D is DE, then DE may be deleted from the mapping set and E may be pushed into the stack. At this time, the mapping set may be {A→BC, B→BC, C→BC, CE, CD, D→CD, E→CE}, and a target line segment corresponding to E may be CE. Then, CE is deleted from the mapping set and C may be pushed into the stack. At this time, the mapping set may be {A→AB, B→BC, C→BC, CD, D→CD, E→empty}. The endpoint stack may be A, D, E, C in sequence from a bottom to a top of the stack. This time D might need to be pushed into the stack, then the endpoint stack may be A, D, E, C, D in sequence from a bottom to a top of the stack. Endpoints above element D may be determined as target endpoints, that is, E, C, and D, and E, C, and D may be constituted as a simple polygon.

Step S30317: Determine a new to-be-deleted target line segment from the at least two target line segments corresponding to the current processed endpoint again, and determine the target endpoints being capable of constituting a ring based on the backed-up mapping set, the backed-up endpoint stack, and the new to-be-deleted target line segment, until the at least two target line segments corresponding to the current processed endpoint being all deleted.

Reference may be made to the description of step S30305 to step S30313 for an explanation of this step. A generated simple polygon may be obtained by using the new to-be-deleted target line segment.

In step S30301 to step S30317, if one endpoint corresponds to a plurality of target line segments, each target line segment may be used as a to-be-deleted target line segment, and ring constitution determining may be performed respectively, to obtain all ring constitution results that satisfy a condition, in other words, various polygons that satisfy the simple polygon condition may be obtained. In this way, comprehensiveness of data can be ensured, and a user can select the most suitable simple polygon according to a specific application need.

An example use case is described below.

Regarding a problem that a polygon generated by using a preset geometric algorithm does not satisfy the simple polygon condition, resulting in that some algorithms cannot be executed correctly, according to aspects described herein, a basic correction algorithm may first be given with respect to a case in which an outer boundary is a "relative simple" polygon, then the basic correction algorithm may be expanded to satisfy a wider range of a usage scenario with respect to a case in which a polygon does not satisfy a "relative simple" condition and input is unordered line segments.

Another examples in which a polygon correction method is applied to a case in which an outer boundary is a "relative simple" polygon is described below.

In many cases, an outer boundary of a polygon with holes generated by an existing geometric algorithm may be a "relative simple" polygon. This may also be consistent with a definition of a qualified polygon with holes in CGAL. For such scenarios, an example polygon correction method is provided. This method may include the following two steps: (1) A simple polygon is generated; and (2) An inclusion relationship is generated. The following two steps are described below.

1. A Simple Polygon is Generated.

A principle of generating a simple polygon is that a "last in, first out" stack structure is defined, and then vertexes in an input polygon are pushed in sequence. Each time a vertex is pushed into the stack, it may be determined whether elements in a current stack may constitute a ring. If the elements in the current starting point stack may constitute a ring, a part that already constitutes a ring may be removed from the stack in time and a simple polygon may be generated. A step like this may be continued in a loop until all vertexes are removed from the stack and the stack is empty. The step may be implemented by the following steps.

Step S701: Determine whether the inputted polygon is a simple polygon.

If the inputted polygon is a simple polygon, the process may end. If the inputted polygon is not a simple polygon, step S702 may be performed.

Step S702: Define a result polygon array V.

Step S703: Define a stack S to temporarily store polygon vertexes.

Step S704: For a starting point of each line segment of the inputted polygon, perform steps S705 to S707.

Step S705: Push a current vertex into a stack top.

Step S706: Check whether a stack top element is located at another position in the stack. If a stack top element is located at another position in the stack, pop all the elements at the position in sequence; otherwise, perform step S707.

Step S707: Connect all the elements popped in step S706 in sequence to constitute a simple polygon P, put the simple polygon P into V, and return to step S708.

Step S708: Pop, if the stack S is not empty, all the elements in the current stack and connect the elements in sequence to constitute a simple polygon P, and put the simple polygon P into V.

Step S709: For all simple polygons in V, if vertexes of the simple polygons are arranged in a clockwise direction, perform a reverse operation, so that the vertexes of the simple polygons are arranged in a counterclockwise direction.

Step S710: Return to the polygon array V.

The following description uses an outer boundary of an original polygon with holes 711 on the left side of FIG. 7 as an example to show a simple polygon generation algorithm. A vertex is pushed into the stack starting from a starting point of a line segment 1. When a starting point of a line segment 8 is pushed, it may be found that the starting point already exists in the stack (that is, a starting point of a line segment 4). At this time, starting points of line segments 5, 6, 7, and 8 may be popped in sequence to constitute a simple polygon $P_1$. Then, remaining vertexes may be pushed into the stack. When a starting point of a line segment 10 is pushed into the stack, the stack pushing process may end. At this time, it may be found that starting points of line segments 1, 2, 3, 4, 9, and 10 still exist in the stack, then the starting points may be popped in sequence, to constitute another simple polygon $P_2$. Final output results may be $P_1$ and $P_2$.

2. An Inclusion Relationship is Generated.

It is possible to generate a plurality of simple polygons without inclusion relationships by using a simple polygon generation algorithm, as shown in a polygon 812 on the right section in FIG. 8. If an original polygon with holes further includes an internal hole, an inclusion relationship between an outer boundary of a new polygon and the original holes might need to be determined. For example, for an original square hole (that is, a small white square in 812 in FIG. 8), it may be necessary to determine whether the original square hole is located inside an outer boundary of a polygon 8121 or inside a boundary of a polygon 8122. Determining whether a given hole and a given outer boundary have an inclusion relationship may be implemented by the following steps.

Step S721: For each vertex on the hole, perform step S722 to step S724.

Step S722: Return true if it is determined that the vertex is located inside an outer boundary.

Step S723: Return false if it is determined that the vertex is located outside the outer boundary.

Step S724: Perform step S721 if the vertex is neither inside nor outside the outer boundary.

Step S725: Return an error identifier if all vertexes of the hole coincide with the outer boundary.

Because it may be ensured that the hole and the outer boundary do not intersect unless an intersection point is at a common vertex of the hole and the outer boundary, once it is determined that a vertex of the hole is located inside or outside the outer boundary, the algorithm may be ended in advance and a result returned. However, if the vertex of the hole is exactly the intersection point, it might not be possible to obtain a clear result, and the inclusion relationship may need to be determined by using remaining vertexes. In some cases, the algorithm may proceed to step S726 only if the hole and the outer boundary completely overlap. At this time, the error identifier may be returned for user reference (but this case generally does not occur).

After obtaining an inclusion relationship between the internal hole and a new outer boundary, the hole might only need to be placed inside a corresponding outer boundary.

In the polygon correction method, for polygons with holes as shown in FIG. 7, without changing effective areas represented by the polygons with holes, new representations as shown in FIG. 8 can be generated just by changing a topological connection relationship of the polygons with holes. For example, for the outer boundary shown as 711 on the left side of FIG. 7, line segments 4 to 7 may be extracted independently to constitute a new simple polygon, and remaining line segments may be used to constitute another simple polygon. Because the former simple polygon is located inside the latter simple polygon, and the two simple polygons only intersect at a vertex, the former polygon may be used as a new internal hole of a corrected polygon with holes, and the latter polygon may be used as an outer boundary of the corrected polygon with holes. For a polygon with holes 712 shown on the right section in FIG. 7, a same or similar decomposition method may be used to decompose an outer boundary of an original "relative simple" into two simple polygons. Because there is not an inclusion relationship between the two polygons, the two polygons may be used as outer boundaries of new polygons with holes. If the original polygon with holes still has holes inside, then the original holes might only need to be added inside the outer boundary that includes the original holes. As shown in 812 on the right section in FIG. 8, the original polygon with holes may be corrected into two independent polygons with holes, that are, a polygon 8121 and a polygon 8122. It may be verified that an effective area represented by the corrected polygon with holes does not change at all, but an outer boundary and internal holes of each polygon with holes may be strictly "simple" and therefore can be used as input to all geometric algorithms.

Figure 9:
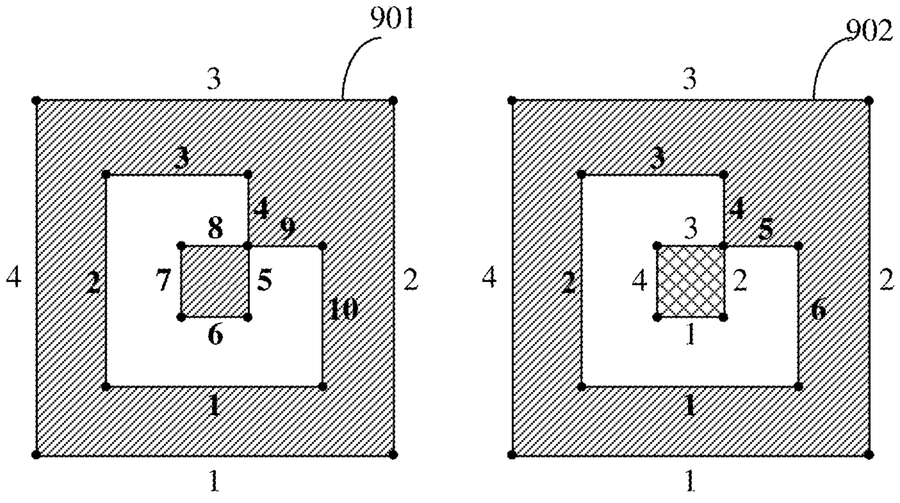
FIG. 9 is a schematic diagram of an example polygon with holes of which an internal hole does not satisfy a relative simple polygon condition and a polygon obtained by correcting the polygon with holes according to one or more aspects described herein.

In practice, it may be found that an outer boundary and internal holes of a polygon with holes obtained by using some computational geometry algorithms do not satisfy the "relative simple" condition, such as the polygon 112 shown in FIG. 1A and an internal hole of 901 on the left section shown in FIG. 9 (that is, a polygon formed by line segments 1 to 10 in 901). In this case, an orientation of the polygon might not be able to be defined, so the outer boundary and internal holes of the polygon with holes might not be able to be used as input to any algorithm. However, after analysis, it may be found that only a few extensions to the foregoing algorithm are needed to complete correction of such polygons with holes.

The step may be implemented by the following processes.

(1) Correcting an outer boundary and internal holes of a polygon with holes respectively by using the foregoing simple polygon generation algorithm to generate a simple polygon array A;

(2) For each simple polygon in A, calculating all polygons included in each simple polygon by using the foregoing inclusion relationship generation algorithm;

(3) Obtaining a quantity of each simple polygon in A is included in another polygon by using a calculation result of step 2. If the quantity is even, put the simple polygon into an outer boundary of a polygon array $A_1$;

(4) For each outer boundary in the outer boundary of the polygon array $A_1$, performing steps 5 and 6;

(5) Setting a current outer boundary as outer_boundary, and setting an internal hole list of the current outer boundary as hole_list;

(6) Determining whether each polygonal hole in hole_list is truly an internal hole of outer_boundary, if each polygonal hole in hole_list is truly an internal hole of outer_boundary, placing each polygonal hole inside outer_boundary; and (7) Returning the outer boundary of the polygon array $A_1$.

Compared with the above-described basic correction algorithm, an extension in a correction algorithm for a non-simple polygon may be to determine whether a hole is truly an internal hole of outer_boundary in step (6). For example, for the internal hole shown in 901 on the left section in FIG. 9, after decomposition is performed on the simple polygon, two mutually nested polygons shown in 902 on the right section may be constituted. Clearly, an inner small square is included inside both an outermost polygon and a next outer polygon. However, the inner small square might not belong to an internal hole of the outermost polygon, and may be an outer boundary of a new polygon with holes.

To determine whether a hole is a real internal hole on an outer boundary, the following algorithm may be used.

Obtaining a list of all polygons included in a current outer boundary;

Determining whether any polygon in the polygon list (except a hole to be determined) includes a current hole, and if any polygon in the polygon list includes a current hole, returning "NO"; and Otherwise, returning "YES".

In some cases, only polygons that are not included in another polygon inside the outer boundary may be considered real holes of the current outer boundary. In such cases, the small square in 902 on the right section may be excluded. In addition, because a quantity of the small square is included in another polygon is two, the small square may be put into the array $A_1$ before and outputted as an independent polygon with holes. In this way, a correction result of the figure on the left side may be two independent polygons with holes (where one of the polygons with holes does not include holes). It may be found that every polygon with holes is a simple polygon.

In some cases, an input to the algorithm might not be a polygon. For example, for a 3D printing slicing program, after using a plane and a three-dimensional model to intersect, only a group of disordered line segments might be obtained. At this time, a robust ring-constitution algorithm might need to be designed first to obtain a series of simple polygons, and a polygon with holes array that satisfies a simple polygon condition may be obtained by using a correction algorithm for a relative simple polygon.

An example polygon generation method for a scenario where input is unordered line segments is described below.

Step S911: Intersect all disordered line segments in pairs, and divide all disordered line segments from intersection points to obtain a line segment array of line segments that intersect only at endpoints, where the line segment array is denoted as A.

Step S912: For each line segment in A, establish a mapping from two endpoints of the line segment to the line segment, and denote an entire mapping set as M.

Step S913: Denote an output simple polygon array as B.

Step S914: If M is not empty, perform step S915 to step S920, otherwise perform step S921.

Step S915: Define a stack S.

Step S916: Extract a key value of a head element of M and push the key value into the stack.

Step S917: If a stack top element of S has a line segment associated with the stack top element in M, remove the line segment from M, push the other endpoint of the line segment into the stack S, and perform step S918, otherwise perform step S919.

Step S918: If an element the same as the stack top element exists in S, pop all the elements above the element in sequence to constitute a simple polygon and place the simple polygon into the array B, otherwise return to step S916.

Step S919: Check whether elements in the stack are capable of constituting a ring. If the elements in the stack are capable of constituting a ring, the elements are popped in sequence to constitute a simple polygon and the simple polygon is placed into the array B, otherwise the entire stack S is cleared.

Step S920: Return to step S914.

Step S921: Return the simple polygon array B.

In this process, when a polygon is generated based on disordered line segments, the disordered line segments may be first intersected in pairs and divided based on intersection points to ensure that all line segments do not intersect internally. For example, for the disordered line segments shown in FIG. 10, by intersecting in pairs and dividing, line segments that cannot constitute a ring may be divided in advance, so that a ring can be constituted successfully. Then, a connection relationship between the line segments may be established by using the mapping set M, so that a ring may be constituted according to the connection relationship. Once a ring is constituted, the ring may be outputted to the array B. Polyline segments not being capable of constituting a ring (corresponding to dangling edges in an arrangement) might not be useful for generating a simple polygon and are therefore discarded.

After a series of simple polygons are obtained by using the ring-constitution algorithm, a correction algorithm for a non-simple polygon may be used to generate a valid polygon with holes.

The correction method for a relative simple polygon and the correction method for a non-relative simple polygon may be used, so that the polygon with holes of which the outer boundary satisfies the "relative simple" condition shown in FIG. 7 can be converted into the polygon with holes shown in FIG. 8 as expected, and the polygon with holes of which the internal holes do not satisfy the "relative simple" condition shown in the left section in FIG. 9 can be successfully converted into the polygon with holes array shown in the right section in FIG. 9. For a case as shown in FIG. 10, a processing result may include: In 1001, original input is four line segments, then the four line segments are converted to two simple polygons after processing, and outer boundaries of the two simple polygons are constituted by triangles. In 1002, original input is five line segments, then the five line segments are converted to two simple polygons after processing, and outer boundaries of the two simple polygons are constituted by right triangles. In 1003, original input is eight line segments (which may constitute two rectangles), then the eight line segments are converted to a polygon with holes after processing, an outer boundary of the polygon with holes is in a shape of "T" and includes a square internal hole.

Figure 11:
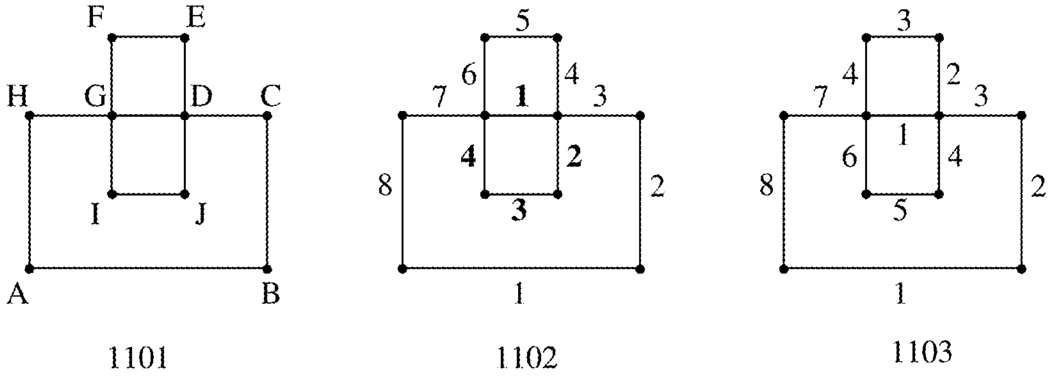
FIG. 11 is a schematic diagram of simple polygons generated based on disordered line segments according to one or more aspects described herein.

According to aspects of the polygon generation method, in an output case that has ambiguous input, such as the input shown as 1003 in FIG. 10, after intersection is performed in pairs, a line segment set shown as 1101 in FIG. 11 can be constituted. After establishing a mapping relationship between a vertex and line segment, a ring may be constituted starting from a point A. When a point D is pushed into a stack, there are two different options: One is to push a point E into the stack, and then continue to constitute a ring in a direction of DE; the other is to push a point J into the stack, and then continue to constitute a ring in a direction of DJ. When a point G is pushed into the stack, there may also be different ring-constitution options implemented in a direction of GH or a direction of GD. Different options may produce different output results. If a ring is constituted in the directions of DE and GH, or in the directions of DJ and GD, a final output result is shown as 1102 in FIG. 11. If a ring is constituted in the directions of DE and GD, or in the directions of DJ and GH, then a final output result is shown as 1103 in FIG. 11. It may be verified that both the output results are valid. However, under different application requirements, a user may prefer a result.

After analysis, the output case often occurs in a case that a specific point in the mapping set corresponds to more than two line segments, e.g., points G and D in 1101 in FIG. 11. If a current stack top element is D, and a next stack top element is C, there is an option whether to turn left or right along CD (where DG cannot be selected). There is also a similar case for the point G. Therefore, in the polygon generation method, each time the stack top element corresponds to more than two line segments in the mapping set, a backtracking method may be used to generate different solutions. For a seventh step in the ring-constitution algorithm, if a quantity of line segments is associated with the stack top element is greater than two, a left-turning line segment_1 and a right-turning line segment_2 may be obtained. First, data in S and M may be backed up, and then a vertex of the right-turning line segment_1 may be pushed, and a final result result_1 may be generated by performing backtracking. Then, backups of S and M may be restored, a vertex of the left-turning line segment_2 may be pushed, and a final result result_2 may be generated by performing backtracking, and so on. If there are n vertexes with degrees greater than two in the mapping set M, there may be $2^n$ final results generated. There may be duplicates among the $2^n$ results, and the duplicates might only need to be removed from the final result.

After such expansion processing, a user may obtain all the ring-constitution results that satisfy the condition, as shown in 1102 and 1103 in FIG. 11. A user may select the most suitable ring-constitution result according to a specific application requirement, and then use a polygon correction method for an outer boundary that does not satisfy a relative simple polygon to generate a polygon with holes or a polygon set.

For a Nest tool in Automatic Lightmap UVs, after an external offset of a polygon is calculated, the correction algorithm may be used to correct the offset, and then a correction result may be used to calculate a Minkowski sum of remaining texture space, so that a success rate of calculating a Minkowski sum can be increased from 92% to 100%. For a Reposition tool in Automatic Lightmap UVs, after a complement of an existing UV island relative to entire texture space is obtained by using Boolean operation, the polygon correction algorithm may be used to correct the complement, and then a correction result may be used to calculate a Voronoi diagram, so that accuracy of calculating the Voronoi diagram can be increased from 89% to 100%. The foregoing test data might all come from art resources of 14 projects of a game, with a total of 3340 model files.

In an extraction tool of visible areas of a three-dimensional model at multi-view angle, for each original triangular patch, after a union of visible areas at different view angles is obtained, each polygon with holes may be corrected by using the polygon correction method, and then a corrected result may be used as input to a constrained Delaunay triangulation method, so that a success rate of the constrained Delaunay triangulation method can be increased from 96% to 100%. The test data may come from a character art resource collection of a game, with a total of 541 model files.

It may be understood that content of user information described herein, such as a to-be-corrected polygon and another relevant data, may require user permission or consent, and collection, use, and processing of related data may need to comply with relevant laws, regulations, and standards of relevant countries and regions.

The following continues to describe a polygon correction apparatus 443 as an exemplary structure of a software module. In some arrangements, as shown in FIG. 3, the software module stored in the polygon correction apparatus 443 of a memory 440 may include:

- a first generating module 4431, configured to obtain a to-be-corrected polygon, and generate at least two simple polygons based on the to-be-corrected polygon;
- a first determining module 4432, configured to determine an inclusion relationship between the at least two simple polygons;
- a second determining module 4433, configured to: determine at least one first simple polygon from the at least two simple polygons based on the inclusion relationship between the at least two simple polygons, and use the first simple polygon as a new outer boundary of a corrected polygon;
- a third determining module 4434, configured to determine an internal hole corresponding to each first simple polygon based on at least one of an original hole of the to-be-corrected polygon and a second simple polygon, the second simple polygon being a polygon other than the first simple polygon among the at least two simple polygons; and
- a second generating module 4435, configured to generate each corrected polygon based on each first simple polygon and the internal hole respectively corresponding to each first simple polygon.

In some arrangements, the first generating module 4431 may be further configured to:

- generate the at least two simple polygons based on an original outer boundary of the to-be-corrected polygon in a case that the original outer boundary of the to-be-corrected polygon satisfies a relative simple polygon condition and the original hole satisfies a simple polygon condition; and
- generate the at least two simple polygons based on the original outer boundary and the original hole in a case that neither the original outer boundary nor the original hole of the to-be-corrected polygon satisfies the simple polygon condition.

In some arrangements, the first generating module 4431 may be further configured to:

- obtain a starting point of each edge on the original outer boundary of the to-be-corrected polygon;
- determine an $i^{th}$ starting point as a current processed starting point, and push the current processed starting point into a pre-created starting point stack, i=1, 2, . . . , N, N being a total quantity of starting points on the original outer boundary;
- pop, in a case that the current processed starting point exists at a position other than a stack top, other starting points located in front of the position and the current processed starting point out of the stack;
- constitute the other starting points and the current processed starting point into a simple polygon, update the current processed starting point into a starting point next to the current processed starting point, and push the current processed starting point into the starting point stack; and
- constitute each starting point in the starting point stack into a simple polygon in response to the starting point stack not being empty in a case that all starting points are pushed into the stack.

In some arrangements, the first generating module 4431 may be further configured to:

- update the current processed starting point into a starting point next to the current processed starting point in a case that the current processed starting point does not exist at a position other than a stack top; and
- push the current processed starting point into the starting point stack.

In some arrangements, the first generating module 4431 may be further configured to:

- connect the current processed starting point and the other starting points in a sequence of popping out of the stack, to obtain an initial polygon;
- determine a vertex arrangement direction of the initial polygon; and
- reverse the initial polygon in a case that the vertex arrangement direction is clockwise, to obtain the simple polygon, a vertex arrangement direction of the simple polygon being counterclockwise.

In some arrangements, the first determining module 4432 may be further configured to:

- obtain a $p^{th}$ simple polygon and a $q^{th}$ simple polygon from the at least two simple polygons, p=1, 2, . . . , M, q=1, 2, . . . , M, and p being not equal to q;
- obtain an $s^{th}$ vertex of the $p^{th}$ simple polygon, s=1, 2, . . . , S, S being a total quantity of vertexes of the $p^{th}$ simple polygon;
- determine that the $q^{th}$ simple polygon includes the $p^{th}$ simple polygon in a case that it is determined that the $s^{th}$ vertex is located inside the $q^{th}$ simple polygon;

determine that the $q^{th}$ simple polygon does not include the $p^{th}$ simple polygon in a case that it is determined that the $s^{th}$ vertex is located outside the $q^{th}$ simple polygon; and obtain an $(s+1)^{th}$ vertex in a case that it is determined that the $s^{th}$ vertex is not located inside the $q^{th}$ simple polygon and is not located outside the $q^{th}$ simple polygon, and determine an inclusion relationship between the $p^{th}$ simple polygon and the $q^{th}$ simple polygon based on the $(s+1)^{th}$ vertex and the $q^{th}$ simple polygon.

In some arrangements, the second determining module 4433 may be further configured to:

determine a simple polygon that is not included in any one of simple polygons among the at least two simple polygons as the first simple polygon based on the inclusion relationship between the at least two simple polygons in a case that the original outer boundary of the to-be-corrected polygon satisfies the relative simple polygon condition, and the original hole satisfies the simple polygon condition.

In some arrangements, the third determining module 4434 may be further configured to:

determine a second simple polygon included in the first simple polygon based on the inclusion relationship between the at least two simple polygons;

determine an original hole existing at an internal vertex of the first simple polygon as an original hole included in the first simple polygon; and determine the second simple polygon included in the first simple polygon and the original hole included in the first simple polygon as internal holes corresponding to the first simple polygon.

In some arrangements, the second determining module 4433 may be further configured to:

obtain a quantity of times each simple polygon is included based on the inclusion relationship between the at least two simple polygons in a case that neither the original outer boundary nor the original hole of the to-be-corrected polygon satisfies the simple polygon condition; and determine a simple polygon that is included for an even quantity of times as the first simple polygon.

In some arrangements, the third determining module 4434 may be further configured to:

determine a second simple polygon included in the first simple polygon based on the inclusion relationship between the at least two simple polygons;

determine the second simple polygon included in the first simple polygon as a candidate hole corresponding to the first simple polygon; and determine a candidate hole that is not included in any one of other candidate holes than the candidate hole as an internal hole corresponding to the first simple polygon.

The description of the polygon correction apparatus may be similar to the description of the methods and processes, and may have beneficial effects similar to the described methods and processes. For details not provided with respect to the apparatus description, reference may be made to the descriptions of the described methods and processes.

In some arrangements, the memory 440 of the server may further include a polygon generation apparatus. The polygon generation apparatus may include:

a line segment division module, configured to obtain a plurality of line segments to be processed, and divide the plurality of line segments to obtain a plurality of target line segments, different target line segments intersecting at an endpoint at most;

a mapping establishment module, configured to establish a mapping set between endpoints of the target line segments and the target line segments based on the plurality of target line segments;

a third generating module, configured to determine target endpoints being capable of constituting a ring based on the mapping set, and generate a simple polygon based on the target endpoints being capable of constituting a ring;

a fourth determining module, configured to determine an inclusion relationship between at least two simple polygons in a case that a quantity of the generated simple polygons is at least two;

a fifth determining module, configured to determine at least one third simple polygon from the at least two simple polygons based on the inclusion relationship between the at least two simple polygons, and use the third simple polygon as an outer boundary of a polygon with holes;

a sixth determining module, configured to determine an internal hole corresponding to each third simple polygon based on a fourth simple polygon, the fourth simple polygon being a polygon other than the third simple polygon among the at least two simple polygons; and a fourth generating module, configured to generate each polygon with holes based on each third simple polygon and the internal hole respectively corresponding to each third simple polygon.

In some arrangements, the mapping set includes a plurality of mapping relationships between the endpoints and the target line segments. Correspondingly, the third generating module may be further configured to:

obtain a $j^{th}$ endpoint from the mapping set, determine the $j^{th}$ endpoint as a current processed endpoint, and push the current processed endpoint into a pre-created endpoint stack, $j=1, 2, \ldots, J$, J being a total quantity of endpoints;

delete, in a case that a target line segment corresponding to the current processed endpoint exists in the mapping set, the target line segment from the mapping set, and push the other endpoint of the target line segment into the endpoint stack;

pop, in a case that the endpoint stack has the same endpoint as a stack top endpoint, each endpoint above the endpoint out of the stack, and determine each endpoint as a target endpoint being capable of constituting a ring;

update the current processed endpoint into an endpoint next to the current processed endpoint, and perform the operation of pushing the current processed endpoint into a pre-created endpoint stack; and determine the current endpoints as target endpoints after each endpoint in the mapping set is pushed into the stack, and in response to the endpoint stack being not empty and current endpoints in the endpoint stack being capable of constituting a ring.

In some arrangements, the third generating module may be further configured to:

back up, in a case that at least two target line segments corresponding to the current processed endpoint exist in the mapping set, a current mapping set and a current endpoint stack to obtain the backed-up mapping set and the backed-up endpoint stack;

determine a to-be-deleted target line segment from the at least two target line segments corresponding to the current processed endpoint;

determine the target endpoints being capable of constituting a ring based on the current mapping set and the to-be-deleted target line segment; and determine a new to-be-deleted target line segment from the at least two target line segments corresponding to the current processed endpoint again, and determine the target endpoints being capable of constituting a ring based on the backed-up mapping set, the backed-up endpoint stack, and the new to-be-deleted target line segment, until the at least two target line segments corresponding to the current processed endpoint being all deleted.

The description of the polygon generation apparatus may be similar to the description of methods and processes provided herein, and may have similar beneficial effects. For details not provided with respect to the apparatus, reference may be made to the descriptions of the similar methods and processes.

Aspects described herein may also provide a computer program product or a computer program. The computer program product or the computer program may include computer instructions stored in a computer-readable storage medium. A processor of a computer device may read the computer instructions from the computer-readable storage medium, and the processor may execute the computer instructions, so that the computer device performs a polygon correction method and a polygon generation method.

Aspects described herein may also provide a computer-readable storage medium having executable instructions stored thereon. When the executable instructions are executed by a processor, the processor (or apparatus) may be enabled to perform a polygon correction method and a polygon generation method, for example, the polygon correction method shown in FIG. 4 and the polygon generation method shown in FIG. 6.

In some arrangements, the computer-readable storage medium may be a memory such as a FRAM, a ROM, a PROM, an EPROM, an EEPROM, a flash memory, a magnetic memory, a compact disc, or a CD-ROM; or may be various devices including one of or any combination of the foregoing memories.

In some arrangements, the executable instructions may be written in the form of program, software, software module, script, or code in any form of programming language (including compilation or interpretation language, or declarative or procedural language), and the executable instructions may be deployed in any form, including being deployed as an independent program or being deployed as a module, component, subroutine, or other units suitable for use in a computing environment.

As an example, the executable instructions may, but not necessarily, correspond to a file in a file system, and may be stored as a part of the file that stores other programs or data, for example, stored in one or more scripts in a Hyper Text Markup Language (HTML) document, stored in a single file dedicated to the program under discussion, or stored in a plurality of collaborative files (for example, a file that stores one or more modules, subroutines, or code parts).

As an example, the executable instructions may be deployed to execute on one computing device or on a plurality of computing devices located in one location, alternatively, on a plurality of computing devices distributed in a plurality of locations and interconnected through communication networks.

and the foregoing description provides examples of aspects of the disclosure and is not intended to limit the scope of protection. Any modification, equivalent replacement, and improvement within the spirit and scope of this disclosure are included in the scope of protection.

What is claimed is:

1. A polygon correction method for generating computerized multi-dimensional shapes for display on an electronic display, performed by an electronic device, the method comprising:

generating at least two simple polygons based on at least one of: a to-be-corrected polygon, and a plurality of line segments, the to-be-corrected polygon being a polygon that does not satisfy a simple polygon condition;

determining an inclusion relationship between the at least two simple polygons;

determining at least one first simple polygon from the at least two simple polygons based on the inclusion relationship between the at least two simple polygons, and using the first simple polygon as a new outer boundary of a corrected polygon;

determining an internal hole corresponding to each first simple polygon based on at least one of: an original hole of the to-be-corrected polygon and a second simple polygon, the second simple polygon being a polygon other than the first simple polygon among the at least two simple polygons; and generating each corrected polygon based on each first simple polygon and the internal hole respectively corresponding to each first simple polygon.

2. The method according to claim 1, wherein the generating at least two simple polygons is based on the to-be-corrected polygon, and comprises:

generating the at least two simple polygons based on an original outer boundary of the to-be-corrected polygon in a case that the original outer boundary of the to-be-corrected polygon satisfies a relative simple polygon condition, and the original hole of the to-be-corrected polygon satisfies the simple polygon condition; and generating the at least two simple polygons based on the original outer boundary of the to-be-corrected polygon and the original hole of the to-be-corrected polygon in a case that neither the original outer boundary nor the original hole satisfies the simple polygon condition.

3. The method according to claim 2, wherein the generating the at least two simple polygons based on an original outer boundary of the to-be-corrected polygon comprises:

obtaining a starting point of each edge on the original outer boundary of the to-be-corrected polygon;

determining an $i^{th}$ starting point as a current processed starting point, and pushing the current processed starting point into a pre-created starting point stack, where $i=1, 2, \ldots, N$, and where N is a total quantity of starting points on the original outer boundary;

popping, in a case that the current processed starting point exists at a position other than a top of the starting point stack, other starting points located in front of the position and the current processed starting point out of the starting point stack;

constituting the other starting points and the current processed starting point into a simple polygon, updating the current processed starting point into a starting point next to the current processed starting point, and performing steps of pushing the current processed starting point onto the pre-created starting point stack; and constituting each starting point in the starting point stack into a simple polygon in response to the starting point stack not being empty in a case that all starting points are pushed onto the stack.

4. The method according to claim 3, further comprising:

updating the current processed starting point to a starting point next to the current processed starting point in a case that the current processed starting point does not exist at a position other than the top of the starting point stack; and performing steps of pushing the current processed starting point onto the pre-created starting point stack.

5. The method according to claim 3, wherein the constituting the other starting points and the current processed starting point to a simple polygon comprises:

connecting the current processed starting point and the other starting points in a sequence of popping out of the starting point stack, to obtain an initial polygon;

determining a vertex arrangement direction of the initial polygon; and reversing the initial polygon in a case that the vertex arrangement direction is clockwise, to obtain the simple polygon, a vertex arrangement direction of the simple polygon being counterclockwise.

6. The method according to claim 1, wherein the determining an inclusion relationship between the at least two simple polygons comprises:

obtaining a $p^{th}$ simple polygon and a $q^{th}$ simple polygon from the at least two simple polygons, where p=1, 2, . . . , M, q=1, 2, . . . , M, p is not equal to q, M is a total quantity of simple polygons, and M is an integer greater than one;

obtaining an $s^{th}$ vertex of the $p^{th}$ simple polygon, where s=1, 2, . . . , S, S is a total quantity of vertexes of the $p^{th}$ simple polygon;

determining that the $q^{th}$ simple polygon comprises the $p^{th}$ simple polygon in a case where the $s^{th}$ vertex is determined to be located inside the $q^{th}$ simple polygon;

determining that the $q^{th}$ simple polygon does not comprise the $p^{th}$ simple polygon in a case where the $s^{th}$ vertex is determined to be located outside the $q^{th}$ simple polygon; and obtaining an $(s+1)^{th}$ vertex in a case where the $s^{th}$ vertex is determined to not be located inside the $q^{th}$ simple polygon and not located outside the $q^{th}$ simple polygon, and determining an inclusion relationship between the $p^{th}$ simple polygon and the $q^{th}$ simple polygon based on the $(s+1)^{th}$ vertex and the $q^{th}$ simple polygon.

7. The method according to claim 1, wherein the determining at least one first simple polygon from the at least two simple polygons based on the inclusion relationship between the at least two simple polygons comprises:

determining a simple polygon that is not comprised in any one of simple polygons among the at least two simple polygons as the first simple polygon based on the inclusion relationship between the at least two simple polygons in a case that the original outer boundary of the to-be-corrected polygon satisfies the relative simple polygon condition, and the original hole of the to-be-corrected polygon satisfies the simple polygon condition.

8. The method according to claim 7, wherein the determining an internal hole corresponding to each first simple polygon based on at least one of an original hole of the to-be-corrected polygon and a second simple polygon comprises:

determining a second simple polygon comprised in the first simple polygon based on the inclusion relationship between the at least two simple polygons;

determining an original hole existing at an internal vertex of the first simple polygon as an original hole comprised in the first simple polygon; and determining the second simple polygon comprised in the first simple polygon and the original hole comprised in the first simple polygon as internal holes corresponding to the first simple polygon.

9. The method according to claim 1, wherein the determining at least one first simple polygon from the at least two simple polygons based on the inclusion relationship between the at least two simple polygons comprises:

obtaining a quantity of times each simple polygon is comprised based on the inclusion relationship between the at least two simple polygons in a case that neither the original outer boundary nor the original hole of the to-be-corrected polygon satisfies the simple polygon condition; and determining a simple polygon that is comprised for an even quantity of times as the first simple polygon.

10. The method according to claim 9, wherein the determining an internal hole corresponding to each first simple polygon based on at least one of an original hole of the to-be-corrected polygon and a second simple polygon comprises:

determining a second simple polygon comprised in the first simple polygon based on the inclusion relationship between the at least two simple polygons;

determining the second simple polygon comprised in the first simple polygon as a candidate hole corresponding to the first simple polygon; and determining a candidate hole that is not comprised in any one of other candidate holes than the candidate hole as an internal hole corresponding to the first simple polygon.

11. The polygon generation method according to claim 1, wherein generating the at least two simple polygons is based on the plurality of line segments, and wherein generating the at least two simple polygons comprises:

obtaining the plurality of line segments to be processed, and dividing the plurality of line segments to obtain a plurality of target line segments, different target line segments intersecting at an endpoint at most;

establishing a mapping set between endpoints of the target line segments and the target line segments based on the plurality of target line segments; and determining target endpoints being capable of constituting a ring based on the mapping set, and generating a simple polygon based on the target endpoints being capable of constituting a ring.

12. The method according to claim 11, wherein the mapping set comprises a plurality of mapping relationships between endpoints and target line segments, and correspondingly, the determining target endpoints being capable of constituting a ring based on the mapping set comprises:

obtaining a $j^{th}$ endpoint from the mapping set, determining the $j^{th}$ endpoint as a current processed endpoint, and pushing the current processed endpoint into a pre-created endpoint stack, where j=1, 2, . . . , J, J being a total quantity of endpoints;

deleting, in a case that a target line segment corresponding to the current processed endpoint exists in the mapping set, the target line segment from the mapping set, and pushing the other endpoint of the target line segment onto the endpoint stack;

popping, in a case that the endpoint stack has a same endpoint as a stack top endpoint, each endpoint above the endpoint out of the stack, and determining each endpoint as a target endpoint being capable of constituting a ring;

updating the current processed endpoint into an endpoint next to the current processed endpoint, and performing the operation of pushing the current processed endpoint into a pre-created endpoint stack; and determining the current endpoints as target endpoints after each endpoint in the mapping set is pushed into the stack, and in response to the endpoint stack being not empty and current endpoints in the endpoint stack being capable of constituting a ring.

13. The method according to claim 12, wherein the determining target endpoints being capable of constituting a ring based on the mapping set comprises:

backing up, in a case that at least two target line segments corresponding to the current processed endpoint exist in the mapping set, a current mapping set and a current endpoint stack to obtain the backed-up mapping set and the backed-up endpoint stack;

determining a to-be-deleted target line segment from the at least two target line segments corresponding to the current processed endpoint;

determining the target endpoints being capable of constituting a ring based on the current mapping set and the to-be-deleted target line segment; and determining a new to-be-deleted target line segment from the at least two target line segments corresponding to the current processed endpoint, and determining the target endpoints being capable of constituting a ring based on the backed-up mapping set, the backed-up endpoint stack, and the new to-be-deleted target line segment, until the at least two target line segments corresponding to the current processed endpoint are all deleted.

14. A polygon correction apparatus for generating computerized multi-dimensional shapes for display on an electronic display, comprising:

a first generating module, configured to generate at least two simple polygons based on at least one of: a to-be-corrected polygon and a plurality of line segments, the to-be-corrected polygon being a polygon that does not satisfy a simple polygon condition;

a first determining module, configured to determine an inclusion relationship between the at least two simple polygons;

a second determining module, configured to determine at least one first simple polygon from the at least two simple polygons based on the inclusion relationship between the at least two simple polygons, and use the first simple polygon as a new outer boundary of a corrected polygon;

a third determining module, configured to determine an internal hole corresponding to each first simple polygon based on at least one of an original hole of the to-be-corrected polygon and a second simple polygon, the second simple polygon being a polygon other than the first simple polygon among the at least two simple polygons; and a second generating module, configured to generate each corrected polygon based on each first simple polygon and the internal hole respectively corresponding to each first simple polygon.

15. The polygon generation apparatus of claim 14, further comprising:

a line segment division module, configured to obtain the plurality of line segments to be processed, and divide the plurality of line segments to obtain a plurality of target line segments, different target line segments intersecting at an endpoint at most; and a mapping establishment module, configured to establish a mapping set between endpoints of the target line segments and the target line segments based on the plurality of target line segments;

a third generating module, configured to determine target endpoints being capable of constituting a ring based on the mapping set, and generate a simple polygon based on the target endpoints being capable of constituting a ring.

16. The polygon generation apparatus of claim 15, wherein the mapping set comprises a plurality of mapping relationships between endpoints and target line segments, and correspondingly, the determining target endpoints being capable of constituting a ring based on the mapping set comprises:

obtaining a $j^{th}$ endpoint from the mapping set, determining the $j^{th}$ endpoint as a current processed endpoint, and pushing the current processed endpoint into a pre-created endpoint stack, where j=1, 2, . . . , J, J being a total quantity of endpoints;

deleting, in a case that a target line segment corresponding to the current processed endpoint exists in the mapping set, the target line segment from the mapping set, and pushing the other endpoint of the target line segment onto the endpoint stack;

popping, in a case that the endpoint stack has a same endpoint as a stack top endpoint, each endpoint above the endpoint out of the stack, and determining each endpoint as a target endpoint being capable of constituting a ring;

updating the current processed endpoint into an endpoint next to the current processed endpoint, and performing the operation of pushing the current processed endpoint into a pre-created endpoint stack; and determining the current endpoints as target endpoints after each endpoint in the mapping set is pushed into the stack, and in response to the endpoint stack being not empty and current endpoints in the endpoint stack being capable of constituting a ring.

17. A non-transitory computer-readable storage medium, having executable instructions stored thereon, and when the executable instructions are executed by a processor, cause a computing device to perform a polygon correction method comprising:

generating at least two simple polygons based on at least one of: a to-be-corrected polygon and a plurality of line segments, the to-be-corrected polygon being a polygon that does not satisfy a simple polygon condition;

determining an inclusion relationship between the at least two simple polygons;

determining at least one first simple polygon from the at least two simple polygons based on the inclusion relationship between the at least two simple polygons, and using the first simple polygon as a new outer boundary of a corrected polygon;

determining an internal hole corresponding to each first simple polygon based on at least one of an original hole of the to-be-corrected polygon and a second simple polygon, the second simple polygon being a polygon other than the first simple polygon among the at least two simple polygons; and generating each corrected polygon based on each first simple polygon and the internal hole respectively corresponding to each first simple polygon.

18. The non-transitory computer readable medium of claim 17, wherein the generating at least two simple polygons is based on the to-be-corrected polygon and comprises:

generating the at least two simple polygons based on an original outer boundary of the to-be-corrected polygon in a case that the original outer boundary of the to-be-corrected polygon satisfies a relative simple polygon condition, and the original hole of the to-be-corrected polygon satisfies the simple polygon condition; and generating the at least two simple polygons based on the original outer boundary of the to-be-corrected polygon and the original hole of the to-be-corrected polygon in a case that neither the original outer boundary nor the original hole satisfies the simple polygon condition.

19. The non-transitory computer readable medium of claim 17, wherein the generating at least two simple polygons is based on the plurality of line segments and comprises:

obtaining the plurality of line segments to be processed, and dividing the plurality of line segments to obtain a plurality of target line segments, different target line segments intersecting at an endpoint at most;

establishing a mapping set between endpoints of the target line segments and the target line segments based on the plurality of target line segments;

determining target endpoints being capable of constituting a ring based on the mapping set, and generating a simple polygon based on the target endpoints being capable of constituting a ring.

20. The non-transitory computer readable medium of claim 19, wherein the mapping set comprises a plurality of mapping relationships between endpoints and target line segments, and correspondingly, the determining target endpoints being capable of constituting a ring based on the mapping set comprises:

obtaining a $j^{th}$ endpoint from the mapping set, determining the $j^{th}$ endpoint as a current processed endpoint, and pushing the current processed endpoint into a pre-created endpoint stack, where j=1, 2, . . . , J, J being a total quantity of endpoints;

deleting, in a case that a target line segment corresponding to the current processed endpoint exists in the mapping set, the target line segment from the mapping set, and pushing the other endpoint of the target line segment onto the endpoint stack;

popping, in a case that the endpoint stack has a same endpoint as a stack top endpoint, each endpoint above the endpoint out of the stack, and determining each endpoint as a target endpoint being capable of constituting a ring;

updating the current processed endpoint into an endpoint next to the current processed endpoint, and performing the operation of pushing the current processed endpoint into a pre-created endpoint stack; and determining the current endpoints as target endpoints after each endpoint in the mapping set is pushed into the stack, and in response to the endpoint stack being not empty and current endpoints in the endpoint stack being capable of constituting a ring.

* * * * *